(12) United States Patent
Perez

(10) Patent No.: US 11,276,025 B2
(45) Date of Patent: Mar. 15, 2022

(54) AUTOMATED OCCUPANT TRACKING SYSTEMS AND METHODS

(71) Applicant: United Parcel Service of America, Inc., Altanta, GA (US)

(72) Inventor: Juan Perez, Atlanta, GA (US)

(73) Assignee: UNITED PARCEL SERVICE OF AMERICA, INC., Atlanta, GA (US)

(*) Notice: Subject to any disclaimer, the term of this patent is extended or adjusted under 35 U.S.C. 154(b) by 271 days.

(21) Appl. No.: 15/791,819

(22) Filed: Oct. 24, 2017

(65) Prior Publication Data
US 2019/0122322 A1     Apr. 25, 2019

(51) Int. Cl.
*G06Q 10/08*     (2012.01)
*H04W 4/02*     (2018.01)
(Continued)

(52) U.S. Cl.
CPC ......... *G06Q 10/0833* (2013.01); *G06F 16/23* (2019.01); *G06F 16/2457* (2019.01);
(Continued)

(58) Field of Classification Search
CPC .... G06F 16/2462; G06F 16/903; G06F 16/23; G06F 16/2457; G06F 16/29; G06Q 50/28;
(Continued)

(56) References Cited

U.S. PATENT DOCUMENTS 5,841,365 A    11/1998 Rimkus
6,618,668 B1    9/2003 Laird
(Continued)

FOREIGN PATENT DOCUMENTS

AU    2017202251 A1    10/2017
EP    1265168 A2 * 12/2002 ......... G06Q 10/1093
(Continued)

OTHER PUBLICATIONS

For some users, mobile future is already here: 4 early adopters and how they're faring; 1994. CMP Media, Inc. Retrieved from http://dialog.proquest.com/professional/docview/674253514?accountid=142257 (Year: 1994).*
(Continued)

*Primary Examiner* — Emmett K. Walsh
(74) *Attorney, Agent, or Firm* — Shook, Hardy and Bacon, L.L.P.

(57) ABSTRACT

An occupancy database is in electronic communication with a plurality of location-specific distributed computing entities to maintain real-time update occupancy data for various entities. As those entities relocate from one location to another (e.g., moving from one apartment to another), distributed computing entities associated with both the prior and new location of the entity transmit information to the occupancy database to reflect the changed location for the entity. The occupancy database also maintains communication data for the entities and/or locations associated with the entities, and the occupancy database may share that communication data with authorized mobile/user computing entities to enable communication between those authorized mobile/user computing entities and the particular entity or devices located at the entity's location.

18 Claims, 8 Drawing Sheets

(51) Int. Cl.
*G06Q 50/28* (2012.01)
*G06F 16/2458* (2019.01)
*G06F 16/29* (2019.01)
*G06F 16/2457* (2019.01)
*G06F 16/903* (2019.01)
*G06F 16/23* (2019.01)
*H04L 67/04* (2022.01)
*H04L 67/10* (2022.01)
*H04L 67/30* (2022.01)

(52) U.S. Cl.
CPC .......... *G06F 16/2462* (2019.01); *G06F 16/29* (2019.01); *G06F 16/903* (2019.01); *G06Q 50/28* (2013.01); *H04L 67/04* (2013.01); *H04L 67/10* (2013.01); *H04L 67/30* (2013.01); *H04W 4/02* (2013.01)

(58) Field of Classification Search
CPC ............. G06Q 10/083; G06Q 10/0833; G06Q 10/0835; G06Q 10/0836; G06Q 10/0837; H04L 67/04; H04L 67/10; H04L 67/30; H04W 4/02
USPC ....................................................... 705/330
See application file for complete search history.

(56) References Cited

U.S. PATENT DOCUMENTS

| | | | |
|---|---|---|---|
| 6,975,941 B1 | 12/2005 | Lau et al. | |
| 7,212,829 B1 | 5/2007 | Lau et al. | |
| 7,511,617 B2 | 3/2009 | Burman et al. | |
| 7,536,188 B1 | 5/2009 | Fegan et al. | |
| 7,624,024 B2 | 11/2009 | Levis et al. | |
| 7,647,231 B2 | 1/2010 | Kuebert et al. | |
| 7,693,745 B1 | 4/2010 | Pomerantz et al. | |
| 8,015,023 B1 | 9/2011 | Lee et al. | |
| 8,108,321 B2 | 1/2012 | Neal et al. | |
| 8,179,238 B2 | 5/2012 | Roberts, Sr. et al. | |
| 8,215,546 B2 | 7/2012 | Lin et al. | |
| 9,082,096 B2 | 7/2015 | Parameswaran et al. | |
| 10,043,188 B2 | 8/2018 | Miller | |
| 10,308,430 B1* | 6/2019 | Brady ................... G05D 1/0027 | |
| 2001/0042055 A1 | 11/2001 | Didriksen et al. | |
| 2002/0016171 A1 | 2/2002 | Doganata et al. | |
| 2002/0103653 A1 | 8/2002 | Huxter | |
| 2003/0216969 A1 | 11/2003 | Bauer et al. | |
| 2003/0222762 A1 | 12/2003 | Beigl et al. | |
| 2004/0236635 A1 | 11/2004 | Publicover | |
| 2005/0099298 A1 | 5/2005 | Mercer et al. | |
| 2006/0015408 A1 | 1/2006 | Brown | |
| 2006/0033609 A1 | 2/2006 | Bridgelall | |
| 2006/0214792 A1 | 9/2006 | Goyal et al. | |
| 2006/0250248 A1 | 11/2006 | Tu et al. | |
| 2006/0282340 A1 | 12/2006 | Morand et al. | |
| 2007/0013526 A1 | 1/2007 | Kazdin et al. | |
| 2007/0052586 A1 | 3/2007 | Horstemeyer | |
| 2007/0057774 A1 | 3/2007 | Kawamata | |
| 2007/0083410 A1 | 4/2007 | Hanna | |
| 2007/0239569 A1 | 10/2007 | Lucas et al. | |
| 2007/0268138 A1 | 11/2007 | Chung et al. | |
| 2007/0296581 A1 | 12/2007 | Schnee et al. | |
| 2008/0052205 A1 | 2/2008 | Dolley et al. | |
| 2008/0068174 A1 | 3/2008 | Al-Mahdawi | |
| 2008/0106377 A1 | 5/2008 | Flores et al. | |
| 2008/0231420 A1 | 9/2008 | Koyama et al. | |
| 2008/0284600 A1 | 11/2008 | Drzaic et al. | |
| 2009/0012802 A1 | 1/2009 | Pinney | |
| 2009/0128360 A1 | 5/2009 | Bianchi et al. | |
| 2009/0146782 A1 | 6/2009 | Cordes | |
| 2009/0146832 A1 | 6/2009 | Ebert et al. | |
| 2009/0189743 A1 | 7/2009 | Abraham et al. | |
| 2009/0195360 A1 | 8/2009 | Jeon et al. | |
| 2009/0201166 A1 | 8/2009 | Itagaki et al. | |
| 2009/0201896 A1 | 8/2009 | Davis et al. | |
| 2009/0224891 A1 | 9/2009 | Vishik et al. | |
| 2009/0316951 A1 | 12/2009 | Soderstrom | |
| 2009/0319078 A1 | 12/2009 | Jackson | |
| 2009/0322510 A1 | 12/2009 | Berger et al. | |
| 2010/0060455 A1 | 3/2010 | Frabasile | |
| 2011/0016488 A1 | 1/2011 | Athias | |
| 2011/0050397 A1 | 3/2011 | Cova | |
| 2011/0119706 A1 | 5/2011 | Scott et al. | |
| 2011/0143727 A1 | 6/2011 | Angelhag | |
| 2011/0178937 A1 | 7/2011 | Bowman | |
| 2011/0202427 A1 | 8/2011 | Garcia et al. | |
| 2011/0238300 A1 | 9/2011 | Schenken | |
| 2012/0030133 A1 | 2/2012 | Rademaker | |
| 2013/0103606 A1 | 4/2013 | Holliday | |
| 2013/0304349 A1 | 11/2013 | Davidson | |
| 2014/0067709 A1* | 3/2014 | Armato ............ G06Q 10/08355 705/338 |
| 2014/0114780 A1 | 4/2014 | Menefee et al. | |
| 2014/0180959 A1* | 6/2014 | Gillen ................ G06Q 10/0833 705/341 |
| 2014/0195454 A1 | 7/2014 | Richie et al. | |
| 2014/0222711 A1 | 8/2014 | Tibbs et al. | |
| 2014/0266669 A1 | 9/2014 | Fadell et al. | |
| 2014/0279648 A1 | 9/2014 | Whitehouse | |
| 2015/0058324 A1 | 2/2015 | Kauwe | |
| 2015/0081583 A1* | 3/2015 | Butler ................ G06Q 10/0833 705/333 |
| 2015/0081587 A1 | 3/2015 | Gillen | |
| 2015/0088652 A1 | 3/2015 | Finley et al. | |
| 2015/0112885 A1* | 4/2015 | Fadell .................... G08B 27/00 705/330 |
| 2015/0120529 A1 | 4/2015 | Faaborg | |
| 2015/0120602 A1* | 4/2015 | Huffman .............. G06Q 10/083 705/339 |
| 2015/0142691 A1 | 5/2015 | Gillen et al. | |
| 2015/0145643 A1* | 5/2015 | Fadell .................. G06Q 10/083 340/5.51 |
| 2015/0149226 A1 | 5/2015 | Horstemeyer | |
| 2015/0156031 A1* | 6/2015 | Fadell .................. G08B 19/005 700/276 |
| 2015/0186869 A1* | 7/2015 | Winters ............. G06Q 10/0834 705/26.81 |
| 2015/0199643 A1 | 7/2015 | Hubner et al. | |
| 2015/0241565 A1 | 8/2015 | Chavez et al. | |
| 2016/0019495 A1 | 1/2016 | Kolchin | |
| 2016/0068264 A1 | 3/2016 | Ganesh et al. | |
| 2016/0071056 A1* | 3/2016 | Ellison ............. G06Q 10/08355 705/338 |
| 2016/0171439 A1 | 6/2016 | Ladden et al. | |
| 2016/0180475 A1 | 6/2016 | Phillips et al. | |
| 2016/0314429 A1* | 10/2016 | Gillen ................... G01S 19/13 |
| 2016/0316322 A1* | 10/2016 | Gillen ................ G06Q 10/0833 |
| 2016/0321604 A1 | 11/2016 | Imaeda et al. | |
| 2017/0061446 A1 | 3/2017 | Shaw et al. | |
| 2017/0091709 A1 | 3/2017 | Mishra et al. | |
| 2017/0169415 A1 | 6/2017 | Daniyalzade et al. | |
| 2017/0193442 A1* | 7/2017 | Ekkel ..................... G06Q 50/32 |
| 2017/0245114 A1* | 8/2017 | Bessho ................ H04W 4/027 |
| 2017/0262798 A1 | 9/2017 | Kosseifi | |
| 2017/0262804 A1 | 9/2017 | Shroff et al. | |
| 2017/0286892 A1 | 10/2017 | Studnicka | |
| 2017/0323259 A1* | 11/2017 | Gillen ................ G06Q 10/0833 |
| 2017/0323545 A1 | 11/2017 | Gillen et al. | |
| 2018/0204178 A1* | 7/2018 | Arshad ............ G06Q 10/08355 |
| 2018/0315015 A1* | 11/2018 | Pientka ................. G06Q 10/06 |
| 2019/0087925 A1 | 3/2019 | Stortstrom et al. | |
| 2020/0293990 A1 | 9/2020 | Mak et al. | |

FOREIGN PATENT DOCUMENTS

| WO | 2014/033559 A1 | 3/2014 |
| WO | 2015/002667 A1 | 1/2015 |

OTHER PUBLICATIONS

United parcel service; 1995. Computerworld, Inc. Retrieved from http://dialog.proquest.com/professional/docview/682146264?accountid=142257 (Year: 1995).*

(56) References Cited

OTHER PUBLICATIONS

United Parcel to Become Big Cellular Customer; 1992. The New York Times Company. Retrieved from http://dialog.proquest.com/professional/docview/671106089?accountid=142257 (Year: 1992).*
Slashgear.com, "Amazon's smart doorbell cold give delivery people access", available at: https://www.slashgear.com/amazons-smart-doorbell-could-give-delivery-people-access-10503429/, last accessed Oct. 27, 2021 (Year: 2017).*
DPD Group, "Follow My Parcel", Available at: <http://www.dpd.co.uk/content/products_services/followmyparcel.jsp>, Retrieved on Jul. 18, 2016, pp. 1-3.
Non-Final Office Action received for U.S. Appl. No. 15/349,189, dated Jun. 28, 2019, 27 pages.
International Search Report and Written Opinion received for PCT Patent Application No. PCT/US18/56094, dated Dec. 21, 2018, 12 pages.
www.uCella.com, Internet Archive appears Dec. 1, 2015 thru Jul. 10, 2017, Aug. 3, 2017, https://web.archive.org/web/20151210084514/http://www.ucella.com:80/.
Wang, Bin, et al., "An Efficient Self-Service Pre-Payment Courier System on Mobile NFC Technology", International Journal ofU- and E-Service, Science and Technology, 2015, vol. 8, No. 4, pp. 103-112, SERSC, Korea.
Unknown Author "Australia Post Develops Wearable Parcel Delivery App", Austria Post Newsroom, Apr. 24, 2015, 1 page retrieved from <https://auspost.newsroom.com.au/Content/Default/01-News-Releases/Article/ Australia-Post-developswearable-parcel-delivery-app/-3/27 /6031> on Sep. 21, 2016.
Steinfield, Charles, "The Development of Location Based Services in Mobile Commerce", 2004, retrieved from <https://msu.edu/-steinfie/ elifelbschap.pdf> on Jul. 18, 2016, 15 pages.
Namiot, D., et al., "Geofence and Network Proximity", Internet of Things, Smart Spaces, and Next Generation Networking, 2013, 6 pages, Springer, Germany retrieved from <http://arxiv.org/ftp/arxiv/papers/1303/1303.5943.pdf> on Jul. 13, 2016.
Lou, Zhe, "NFC Enabled Smart Postal System", 2010 Second International Workshop on Near Field Communication, Apr. 2010, pp. 33-38, IEEE, U.S.A.
Bennyblogger "Imminent Delivery Notification", Your Postal Blog, Sep. 19, 2013, 4 pages, retrieved from <https://yourpostalblog.wordpress.com/2013/09/19/imminent-delivery-notification/> on Jul. 18, 2016.
Final Office Action received for U.S. Appl. No. 15/349,189, dated Feb. 3, 2020, 27 pages.
Non-Final Office Action received for U.S. Appl. No. 15/792,263, dated Feb. 5, 2020, 13 pages.
Notice of Allowance received for U.S. Appl. No. 15/792,263, dated Jun. 24, 2020, 12 pages.
Non-Final Office Action received for U.S. Appl. No. 15/349,189, dated Oct. 5, 2020, 24 pages.
Final Office Action received for U.S. Appl. No. 15/349,189, dated Apr. 20, 2021, 29 pages.
Non-Final Office Action received for U.S. Appl. No. 15/349,189, dated Oct. 1, 2021, 30 pages.

* cited by examiner

| John Doe | | |
|---|---|---|
| | Current Address | |
| | 123 Main Street | |
| | Unit 100A | |
| | Atlanta, GA 30309 | |
| | Contact Information | |
| | Phone: (123) 456-7890 | |
| | Twitter: @JDoe123 | |
| | Email: jdoe@email.com | |
| | IOT devices | |
| | Status: At home/available | |
| | Connection access: door.exe | |
| | Prior Addresses | |
| | 456 Front Street | 7890 Ocean Ave. |
| | Apt 555 | Apt 333 |
| | Anytown, MI 12345 | Anytown, MI 12345 |

Fig. 5

United States Patent US 11,276,025 B2

AUTOMATED OCCUPANT TRACKING SYSTEMS AND METHODS

BACKGROUND

Couriers, service providers, and other entities often encounter issues in locating item/shipment or service recipients at multi-unit buildings (e.g., apartment buildings, condominium buildings, office buildings, and/or the like). One of the common causes of these delivery problems stems from incomplete destination address information/data being provided to the service provider, either in the form of an item/shipment delivery address or a service request. For example, an item/shipment delivery address may include a street address, but may omit a relevant unit number for the item/shipment.

Even when the service provider knows the location within the multi-unit building (based on memory alone, for example) for providing the requested services, missing a unit number may cause additional difficulties for the service provider. For example, the multi-unit building may require a service provider to call a particular unit to gain access to the building, and the building may require that the service provider know the relevant unit number when requesting entry.

These and other service issues are particularly prevalent in the context of delivering items/shipments to apartments, because apartment residents often move between units and/or buildings. The constant movement of apartment residents may cause difficulties for delivery drivers to remember where particular residents live, and so those delivery personnel must rely more heavily on complete delivery address information/data provided for items/shipments. Moreover, automated delivery systems (e.g., drone-based delivery) require complete delivery information/data be provided for all deliveries because the delivery mechanisms do not have the capability of simply remembering appropriate delivery locations for various individuals.

Accordingly, a need exists for systems and methods for providing complete address information/data for various locations to ease access for providing services at those locations.

BRIEF SUMMARY

Various embodiments are directed to systems and methods for maintaining a real-time updated occupancy database of occupancy information/data for various locations and/or entities through real-time interactions among a plurality of distributed computing entities. The collection of distributed computing entities is configured to automatically provide and verify occupancy information/data for various entities upon determination that the entity has moved to a new location. This occupancy information/data may be provided to service providers en route to provide services (e.g., delivery services) to those entities, thereby easing contact with the entity and locating the entity to provide the desired services.

Various embodiments are directed to an automated method for confirming real-time item recipient availability via a mobile computing entity in communication with a central occupancy database. In certain embodiments, the method comprises: receiving, at the central database and from a plurality of service point devices located at respective service points each associated with a particular entity of a plurality of entities, real-time entity status data for each entity of the plurality of entities; updating availability data stored in entity profiles corresponding to each entity of the plurality of entities to reflect the real-time entity status for each entity; receiving, at the central database and from the mobile computing entity, a query for entity status data for a first entity; retrieving status data for the first entity from a first entity profile corresponding to the first entity; and upon determining that the real-time status data for the first entity indicates that the first entity is available at a service point associated with the first entity, transmitting an indicator to the mobile computing entity to complete delivery of an item at the service point associated with the first entity.

In certain embodiments, the method further comprises, upon determining that the real-time status data for the first entity indicates that the first entity is unavailable, transmit an alternative indicator to the mobile computing entity. The alternative indicator may identify an alternative delivery location to complete delivery of the item. Moreover, the first entity profiles may comprise connectivity data identifying wireless communication types accepted by wireless electronic devices associated with the first entity, and the method may further comprise: transmitting at least a portion of the connectivity data from the first entity profile to the mobile computing entity to enable the mobile computing entity to wirelessly communicate with at least one electronic device associated with the first entity. The connectivity data may identify wireless connectivity data for the service point device associated with the first entity, and transmitting at least a portion of the connectivity data may comprise transmitting the wireless connectivity data to enable wireless communication between the mobile computing entity and the service point device. Moreover, in certain embodiments, the connectivity data identifies wireless connectivity data for a mobile computing entity associated with the first entity, and wherein transmitting at least a portion of the connectivity data comprises transmitting the wireless connectivity data to enable wireless communication between the mobile computing entity associated with the delivery personnel and the mobile computing entity associated with the first entity.

In certain embodiments, the query for first entity status data comprises a first entity identifier and retrieving the status for the first entity comprises: identifying an entity profile having the first entity identifier; and retrieving the status data from the identified entity profile.

Moreover, certain embodiments are directed to a computer system for confirming real-time item recipient availability via a mobile computing entity in communication with a central occupancy database. The system may comprise: a mobile computing entity comprising at least one non-transitory memory storage entity and at least one processor, wherein the mobile computing entity is configured to generate an inquiry for entity status data for a first entity scheduled to receive an item delivery; and an occupancy database comprising at least one non-transitory memory storage entity storing a plurality of entity profiles corresponding to a plurality of entities, and wherein the occupancy database is configured to: receive real-time status data from a plurality of service point devices each corresponding to a particular service point and a particular entity; update entity profiles to reflect the real-time status data for entities corresponding to each of the entity profiles; receive the inquiry for entity status data for the first entity; retrieve real-time status data for the first entity, wherein the real-time status data indicates whether the first entity is located at a corresponding service point; and transmit the real-time status data to the mobile computing entity.

In certain embodiments the mobile computing entity is further configured to: receive the real-time status data; and generate delivery confirmation data after receipt of the real-time status data. Moreover, each of the plurality of entity profiles may comprise connectivity data for the corresponding entity, and wherein the occupancy database is configured to transmit connectivity data stored in the first entity profile to the mobile computing entity; and the mobile computing entity may be configured to, based at least in part on the connectivity data, establish a wireless communication connection between the mobile computing entity and the service point device associated with the first entity.

In certain embodiments, the mobile computing entity is configured to generate the delivery confirmation data upon establishing a wireless communication connection with the service point device associated with the first entity.

Certain embodiments are directed to a computer system for automatically confirming real-time item recipient availability via a mobile computing entity in communication with a central occupancy database. In certain embodiments, the system comprises one or more non-transitory memory storage areas and one or more processors, the one or more processors being collectively configured to: receive, from a plurality of service point devices located at respective service points each associated with a particular entity of a plurality of entities, real-time entity status data for each entity of the plurality of entities; update availability data stored in entity profiles corresponding to each entity of the plurality of entities to reflect the real-time entity status for each entity; receive, from the mobile computing entity, a query for entity status data for a first entity; retrieve, from the one or more non-transitory memory storage areas, status data for the first entity from a first entity profile corresponding to the first entity; and upon determining that the real-time status data for the first entity indicates that the first entity is available at a service point associated with the first entity, transmit an indicator to the mobile computing entity to complete delivery of an item at the service point associated with the first entity.

Various embodiments are directed to an automated method for coordinating electronic interactions among a plurality of distributed computing entities to maintain real-time occupancy data for a plurality of entities. In certain embodiments, the method comprises: receiving, from a first distributed computing entity, occupancy update data for a first entity, wherein the occupancy update data indicates that the first entity moved to a first location; querying an occupancy database for a first entity profile corresponding to the first entity, wherein the occupancy database stores occupancy data for a plurality of entities in corresponding entity profiles; retrieving stored occupancy data from the first entity profile, wherein the stored occupancy data identifies a second distributed computing entity associated with a second location; querying the second distributed computing entity associated with the second location for occupancy termination data corresponding to the first entity; and upon receipt of occupancy termination data corresponding to the first entity, update the first occupancy profile to reflect the occupancy update data.

In various embodiments, the occupancy database is a blockchain database, and wherein retrieving stored occupancy data from the first entity profile comprises retrieving data from a block of the blockchain generated prior in time and comprising occupancy data for the first entity. Moreover, the first distributed computing entity may be a first apartment management computing entity associated with a first apartment complex and the second distributed computing entity may be a second apartment management computing entity associated with a second apartment complex. In certain embodiments, the method comprises steps for requesting a manual override if occupancy termination data is not received, for example, within a defined period of time.

In certain embodiments, each of the plurality of entity profiles identifies one or more prior locations occupied by the entity, and updating the first occupancy profile may comprise: moving the stored occupancy data to a prior occupancy portion of the first entity profile; and populating a current occupancy portion of the first entity profile with the occupancy update data.

In certain embodiments, the entity profiles comprise contact data for corresponding entities, and wherein updating the first occupancy profile comprises updating the contact data stored in the first entity profile. Moreover, the occupancy update data may comprise identifier data for the first entity, and wherein querying the occupancy database for the first entity profile corresponding to the first entity may comprise querying the occupancy database for an entity profile comprising the identifier data.

Certain embodiments are directed to an automated system for coordinating electronic interactions among a plurality of distributed computing entities to maintain real-time occupancy data for a plurality of entities. In certain embodiments, the system comprises: an occupancy database comprising a non-transitory memory, wherein the occupancy database stores a plurality of entity profiles each corresponding to a particular entity and each comprising stored occupancy data for corresponding entities; a first distributed computing entity configured to: transmit occupancy update data to the occupancy database for a first entity, wherein the occupancy update data indicates that the first entity began an occupancy at a first occupancy location; and a second distributed computing entity associated with a second occupancy location configured to: transmit occupancy termination data to the occupancy database for the first entity, wherein the occupancy termination data indicates that the first entity terminated occupancy at the second location; and wherein the occupancy database is configured to update a first entity profile corresponding to the first entity to reflect the occupancy update data upon receipt of the occupancy termination data for the first entity.

In certain embodiments, the occupancy database is a distributed database stored via a plurality of computing entities. Moreover, the occupancy database may be a blockchain database. The occupancy database may be further configured to: in response to receipt of occupancy update data for the first entity from the first distributed computing entity, retrieve a first entity profile corresponding to the first entity; identify the second distributed computing entity as a prior occupancy location for the first entity; and transmit a query for occupancy termination data to the second distributed computing entity. The occupancy update data may comprise identifier data for the first entity, and wherein the occupancy database is configured to retrieve a first entity profile based at least in part on the identifier data.

Various embodiments are directed to an automated computer system for coordinating electronic interactions among a plurality of distributed computing entities to maintain real-time occupancy data for a plurality of entities. In certain embodiments, the system comprises one or more non-transitory memory storage areas and one or more processors, the one or more processors may be collectively configured to: receive, from a first distributed computing entity, occupancy update data for a first entity, wherein the occupancy update data indicates that the first entity moved to a first location; query an occupancy database for a first entity profile corresponding to the first entity, wherein the occupancy database stores occupancy data for a plurality of entities in corresponding entity profiles; retrieve stored occupancy data from the first entity profile, wherein the prior occupancy data identifies a second distributed computing entity associated with a second location; query the second distributed computing entity associated with the second location for occupancy termination data corresponding to the first entity; and upon receipt of occupancy termination data corresponding to the first entity, update the first occupancy profile to reflect the occupancy update data.

BRIEF DESCRIPTION OF THE SEVERAL VIEWS OF THE DRAWINGS

Reference will now be made to the accompanying drawings, which are not necessarily drawn to scale, and wherein:

FIG. 5 shows an example entity profile according to various embodiments;

DETAILED DESCRIPTION

Figure 1:
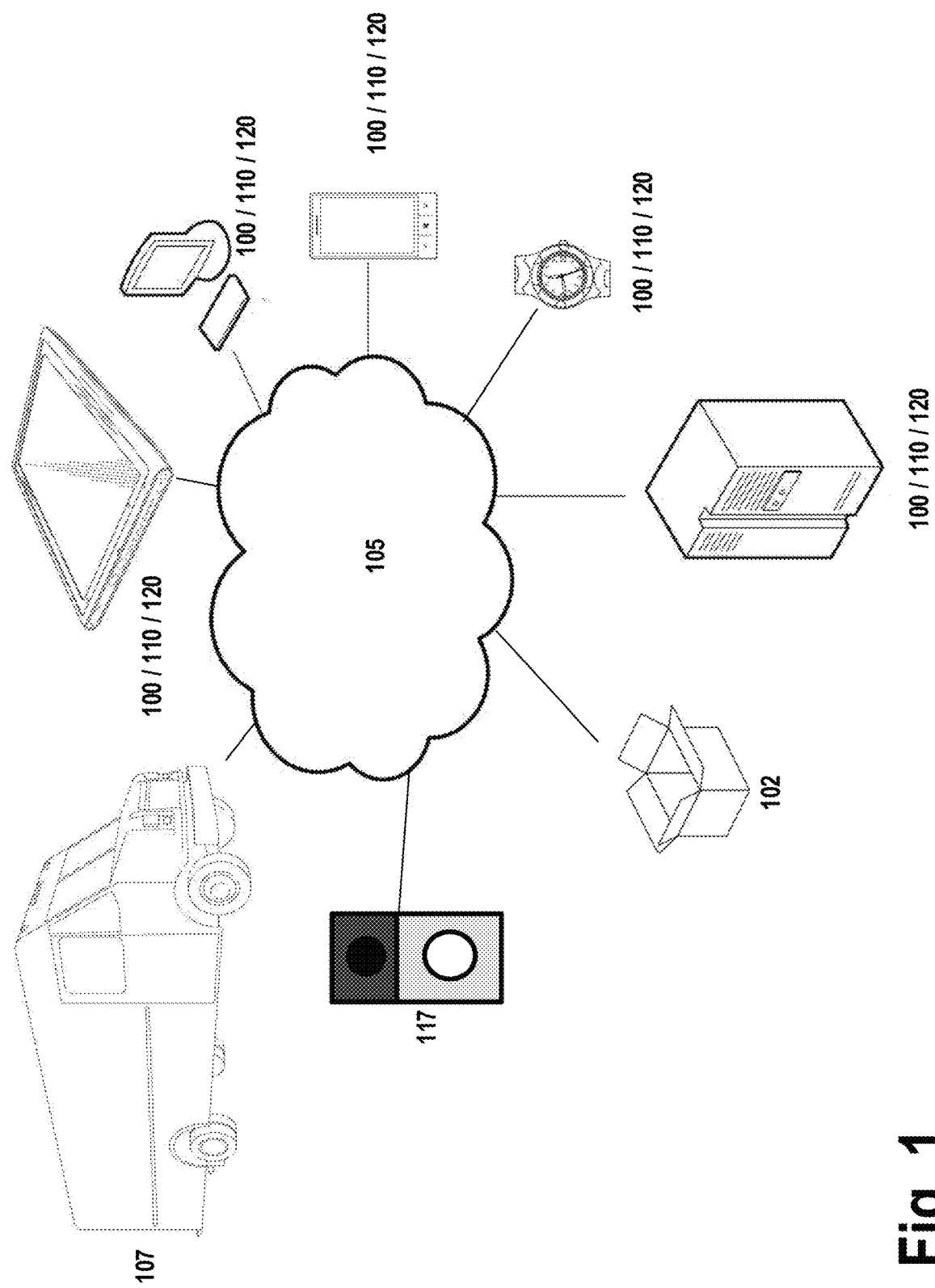
FIG. 1 shows an example network of computing entities utilized in accordance with various embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

I. Overview

Occupancy information/data for various entities (e.g., residential information/data for individuals, business locales for business entities, and/or the like), is stored in an occupancy database embodied as a database structure (e.g., a centrally stored relational database; a distributed relational database; a distributed blockchain database; a centralized blockchain database; and/or the like). The occupancy information/data is generated, maintained, and verified based on information/data received from a plurality of distributed data sources, such as electronic property records maintained by a municipality, lease information/data maintained by a property manager, and/or the like. The occupancy information/data comprises a plurality of entity profiles, each entity profile corresponding to an entity (e.g., an individual, a business, and/or the like). Those entity profiles comprise information/data indicative of a current occupancy location for the entity, which may include street address, unit number, and/or the like. The entity profiles may additionally include contact information/data for the entity (e.g., phone number, email address, social network contact information, and/or the like). The entity profiles may additionally comprise connection information/data for service point devices (e.g., Internet of Things (IOT) connected devices) within the unit/address/service point occupied by the particular entity. These service point devices may provide additional information/data about the unit/address/service point for service providers, such as whether the entity is available at the unit/address/service point.

The occupancy information/data stored within the entity profile may additionally comprise information/data indicative of previous units/addresses/service points occupied by the entity. This information/data may be stored in "blocks" of a blockchain, in columns/rows of a relational database, and/or the like. Accordingly, the occupancy information/data stored in the entity profile maintains occupancy information/data for entities over time.

At least portions of the information/data stored in the occupancy database may be accessible via network connected devices (e.g., computing entities, mobile devices, and/or the like). As just one example, the information/data may be accessible via a specially configured computer program operating on a mobile device configured to query and/or retrieve information/data from the occupancy database. Certain network connected devices may have read/write access to the information, and/or network connected devices may be limited to read access (e.g., read access for all information/data stored in the occupancy database or read access for only a portion of information/data stored in the occupancy database). For example, the information/data stored in the occupancy database may be accessible to computing entities (e.g., mobile user computing entities) carried by delivery personnel, such that the occupancy database may be utilized to provide complete delivery information/data for items/shipments to be delivered to various entities. The user computing entity carried by the delivery personnel may be configured to automatically access the occupancy database to retrieve additional information/data regarding particular entities based on information/data provided for upcoming/expected deliveries for the delivery personnel.

Moreover, the occupancy database may be utilized to identify contact information/data for item/shipment recipients, such that the delivery personnel may contact item/shipment recipients before arriving at the delivery destination. Furthermore, the occupancy database, through connections with service point devices (e.g., IOT devices) at various units/addresses/service points, may provide information/data to the delivery personnel regarding whether an individual is available to accept delivery at the unit/address/service point. Through these service point devices, the occupancy information/data may enable the delivery personnel's computing entity to establish wireless connectivity with these service point devices such that the delivery personnel's computing entity may directly retrieve information/data from these devices, may provide automatic, electronic delivery signatures evidencing a delivery personnel's visit to a particular location, and/or to operate various electronic devices (e.g., door locks, garage doors, and/or the like) at the unit/address/service point to gain access to otherwise restricted areas to complete a delivery.

In certain embodiments, the occupancy database may identify links between various entity profiles to identify potential alternative delivery locations if delivery to the entity is unsuccessful. For example, entity profiles for various entities may be linked with property management profiles, nearby delivery consolidation points, and/or the like. These linked profiles may identify potential alternative delivery locations for items/shipments upon determining that delivery to the unit/address/service point corresponding to an entity is not possible (e.g., no one available to accept delivery). Accordingly, the occupancy database may provide various information/data types to ease delivery by delivery personnel.

II. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Moreover, certain embodiments may comprise and/or encompass blockchain-based database structures. These blockchain-based database structures may be embodied as distributed or centrally-managed ledger database structures. The distributed ledger database system may be a public or private database, and may be stored on a plurality of computing nodes to provide backup storage and/or to provide transaction verification mechanisms as discussed herein.

In certain embodiments, the distributed ledger system may comprise a plurality of blocks, wherein blocks generated later-in-time are electronically linked to prior-generated blocks to provide a completely linked block chain indicative of each transaction for which information/data is stored in the distributed ledger. Each block may comprise information/data identifying a particular parcel, a particular location, a particular entity, and/or the like, and information/data corresponding to the parcel, location, or entity. Accordingly, by identifying all blocks stored in the distributed ledger relating to a particular parcel, location, and/or entity, a complete historical record may be established for the parcel, location, and/or entity.

In certain embodiments, each new block may be generated upon receipt of information/data indicating a change in status of the parcel, location, and/or entity (e.g., received by a computer node). For example, each time a parcel moves from first carrier personnel to second carrier personnel or each time an entity moves from a first residential address to a second residential address, a new block may be generated for the distributed ledger. In certain embodiments, a plurality of computing entities may be configured to monitor, update, and/or verify information/data for a plurality of parcels, entities, and/or locations.

Certain embodiments may comprise a plurality of linked distributed ledgers each providing varying information/data regarding respective parcels, entities, and/or locations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 provides an illustration of an exemplary embodiment of the present invention. As shown in FIG. 1, this particular embodiment may include one or more occupancy computing entities 100, one or more items/shipments 102, one or more networks 105, one or more vehicles 107, one or more distributed computing entities 110, one or more service point devices 117, one or more user computing entities 120, and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Occupancy Computing Entity

Figure 2:
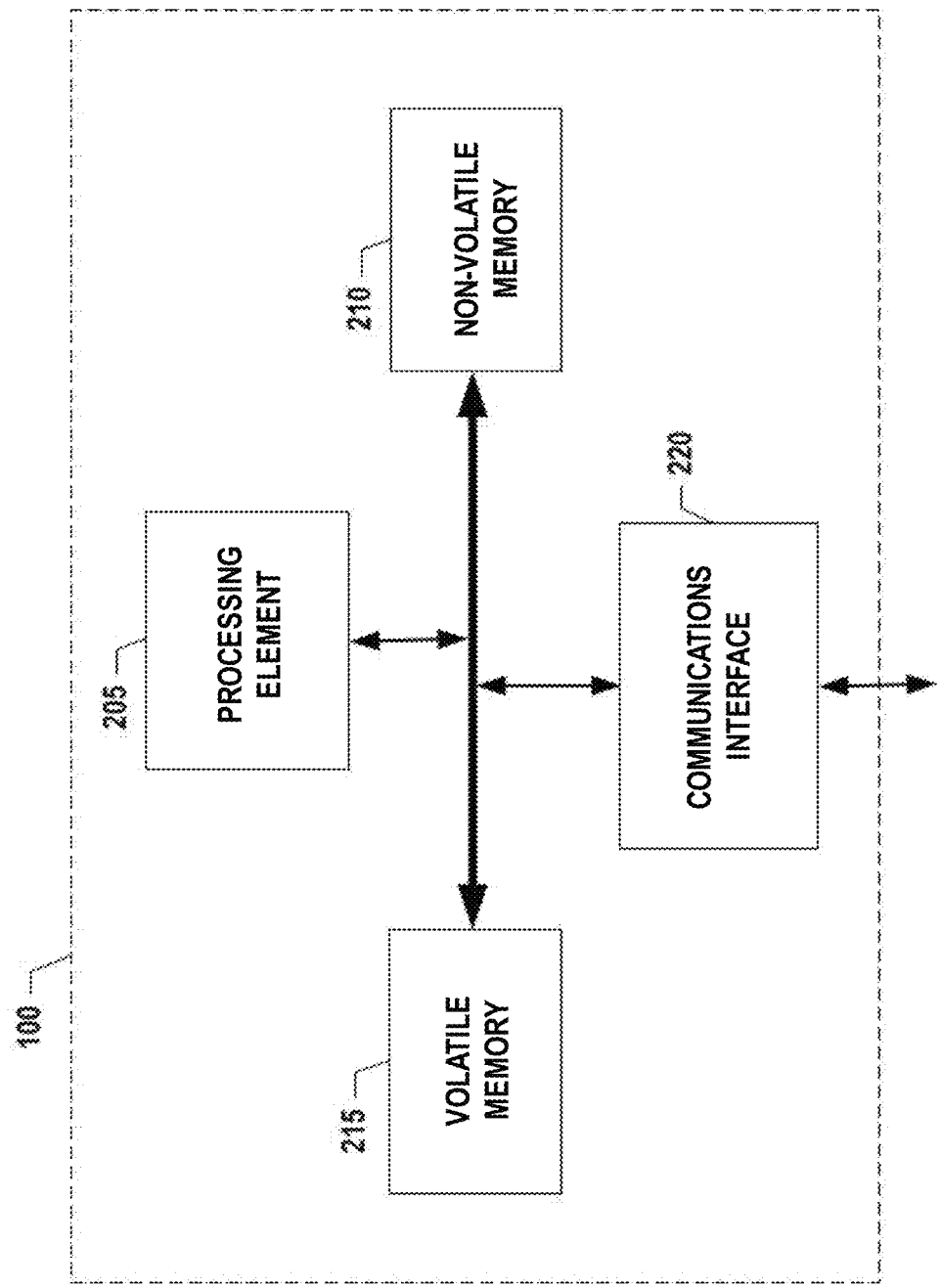
FIG. 2 shows a schematic diagram of an example occupancy computing entity according to various embodiments.

FIG. 2 provides a schematic of an occupancy computing entity 100 according to one embodiment of the present invention. In certain embodiments, the occupancy computing entity 100 may be maintained by and/or accessible by a carrier. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Amazon, Google, Uber, ride-sharing services, crowd-sourcing services, retailers, and/or the like. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the occupancy computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the occupancy computing entity 100 may communicate with distributed computing entities 110, user computing entities 120, and/or the like.

As shown in FIG. 2, in one embodiment, the occupancy computing entity 100 may include or be in communication with one or more processing elements 205 (also referred to as processors, processing circuitry, processing devices, and/or similar terms used herein interchangeably) that communicate with other elements within the occupancy computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the occupancy computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The terms database, database instance, database management system, and/or similar terms used herein interchangeably may refer to a structured collection of records or data that is stored in a computer-readable storage medium, such as via a relational database, hierarchical database, blockchain database, and/or network database.

In one embodiment, the occupancy computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the occupancy computing entity 100 with the assistance of the processing element 205 and operating system.

As indicated, in one embodiment, the occupancy computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the occupancy computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Bluetooth protocols, Wibree, Home Radio Frequency (HomeRF), Simple Wireless Abstract Protocol (SWAP), wireless universal serial bus (USB) protocols, and/or any other wireless protocol.

Although not shown, the occupancy computing entity 100 may include or be in communication with one or more input elements, such as a keyboard input, a mouse input, a touch screen/display input, motion input, movement input, audio input, pointing device input, joystick input, keypad input, and/or the like. The occupancy computing entity 100 may also include or be in communication with one or more output elements (not shown), such as audio output, video output, screen/display output, motion output, movement output, and/or the like.

As will be appreciated, one or more of the occupancy computing entity's 100 components may be located remotely from other occupancy computing entity 100 components, such as in a distributed system. Furthermore, one or more of the components may be combined and additional components performing functions described herein may be included in the occupancy computing entity 100. Thus, the occupancy computing entity 100 can be adapted to accommodate a variety of needs and circumstances. As will be recognized, these architectures and descriptions are provided for exemplary purposes only and are not limited to the various embodiments.

2. Exemplary Vehicle

In various embodiments, the term vehicle 107 is used generically. For example, a carrier/transporter vehicle 107 may be a manned or unmanned tractor, a truck, a car, a motorcycle, a moped, a Segway, a bicycle, a golf cart, a hand truck, a cart, a trailer, a tractor and trailer combination, a van, a flatbed truck, a vehicle, an unmanned aerial vehicle (UAV) (e.g., a drone), an airplane, a helicopter, a boat, a barge, and/or any other form of object for moving or transporting people and/or items/shipments (e.g., one or more packages, parcels, bags, containers, loads, crates, items banded together, vehicle parts, pallets, drums, the like, and/or similar words used herein interchangeably). In one embodiment, each vehicle 107 may be associated with a unique vehicle identifier (such as a vehicle ID) that uniquely identifies the vehicle 107. The unique vehicle ID (e.g., trailer ID, tractor ID, vehicle ID, and/or the like) may include characters, such as numbers, letters, symbols, and/or the like. For example, an alpha, numeric, or alphanumeric vehicle ID (e.g., "AS") may be associated with each vehicle 107. In another embodiment, the unique vehicle ID may be the license plate, registration number, or other identifying information/data assigned to the vehicle 107. As noted above, in instances where the vehicle is a carrier vehicle, the vehicle may be a self-driving delivery vehicle or the like. Thus, for the purpose of the present disclosure, the term driver of a delivery vehicle may be used to refer to a carrier personnel who drives a delivery vehicle and/or delivers items/shipments therefrom, an autonomous system configured to deliver items/shipments (e.g., a robot configured to transport items/shipments from a vehicle to a service point such as a customer's front door or other service point), and/or the like.

Various computing entities, devices, and/or similar words used herein interchangeably can be associated with the vehicle 107, such as a data collection device or other computing entities. In general, the terms computing entity, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The data collection device may collect telematics information/data (including location information/data) and transmit/send the information/data to an onboard computing entity, a distributed computing entity, and/or various other computing entities via one of several communication methods.

In one embodiment, the data collection device may include, be associated with, or be in wired or wireless communication with one or more processors (various exemplary processors are described in greater detail below), one or more location-determining devices or one or more location sensors (e.g., Global Navigation Satellite System (GNSS) sensors), one or more telematics sensors, one or more real-time clocks, a J-Bus protocol architecture, one or more electronic control modules (ECM), one or more communication ports for receiving telematics information/data from various sensors (e.g., via a CAN-bus), one or more communication ports for transmitting/sending information/data, one or more RFID tags/sensors, one or more power sources, one or more data radios for communication with a variety of communication networks, one or more memory modules 410, and one or more programmable logic controllers (PLC). It should be noted that many of these components may be located in the vehicle 107 but external to the data collection device.

In one embodiment, the one or more location sensors, modules, or similar words used herein interchangeably may be one of several components in wired or wireless communication with or available to the data collection device. Moreover, the one or more location sensors may be compatible with GPS satellites, such as Low Earth Orbit (LEO) satellite systems, Department of Defense (DOD) satellite systems, the European Union Galileo positioning systems, Global Navigation Satellite systems (GLONASS), the Chinese Compass navigation systems, Indian Regional Navigational satellite systems, and/or the like. Furthermore, the one or more location sensors may be compatible with Assisted GPS (A-GPS) for quick time to first fix and jump start the ability of the location sensors to acquire location almanac and ephemeris data, and/or be compatible with Satellite Based Augmentation System (SBAS) such as Wide Area Augmentation System (WAAS), European Geostationary Navigation Overlay Service (EGNOS), and/or MTSAT Satellite Augmentation System (MSAS), GPS Aided GEO Augmented Navigation (GAGAN) to increase GPS accuracy. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle 107 and/or the vehicle's operator and with various communication points (e.g., cellular towers or Wi-Fi access points) positioned at various locations throughout a geographic area to monitor the location of the vehicle 107 and/or its operator. The one or more location sensors may be used to receive latitude, longitude, altitude, heading or direction, geocode, course, position, time, and/or speed data (e.g., referred to herein as telematics information/data and further described herein below). The one or more location sensors may also communicate with the occupancy computing entity, the data collection device, distributed computing entity, user computing entity, and/or similar computing entities.

As indicated, in addition to the one or more location sensors, the data collection device may include and/or be associated with one or more telematics sensors, modules, and/or similar words used herein interchangeably. For example, the telematics sensors may include vehicle sensors, such as engine, fuel, odometer, hubometer, tire pressure, location, weight, emissions, door, and speed sensors. The telematics information/data may include, but is not limited to, speed data, emissions data, RPM data, tire pressure data, oil pressure data, seat belt usage data, distance data, fuel data, idle data, and/or the like (e.g., referred to herein as telematics information/data). The telematics sensors may include environmental sensors, such as air quality sensors, temperature sensors, and/or the like. Thus, the telematics information/data may also include carbon monoxide (CO), nitrogen oxides (NOx), sulfur oxides (SOx), Ethylene Oxide (EtO), ozone ($O_3$), hydrogen sulfide ($H_2S$) and/or ammonium ($NH_4$) data, and/or meteorological data (e.g., referred to herein as telematics information/data).

In one embodiment, the ECM may be one of several components in communication with and/or available to the data collection device. The ECM, which may be a scalable and subservient device to the data collection device, may have data processing capability to decode and store analog and digital inputs from vehicle systems and sensors. The ECM may further have data processing capability to collect and present telematics information/data to the J-Bus (which may allow transmission to the data collection device), and output standard vehicle diagnostic codes when received from a vehicle's J-Bus-compatible on-board controllers 440 and/or sensors.

As indicated, a communication port may be one of several components available in the data collection device (or be in or as a separate computing entity). Embodiments of the communication port may include an Infrared Data Association (IrDA) communication port, a data radio, and/or a serial port. The communication port may receive instructions for the data collection device. These instructions may be specific to the vehicle 107 in which the data collection device is installed, specific to the geographic area in which the vehicle 107 will be traveling, specific to the function the vehicle 107 serves within a fleet, and/or the like. In one embodiment, the data radio may be configured to communicate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth, USB, Wibree, HomeRF, SWAP, and/or the like. Similarly, the distributed computing entity 110 may operate in accordance with multiple wired communication standards and protocols, such as those described above with regard to the occupancy computing entity 100 via a network interface 320.

3. Exemplary Item/Shipment

An item/shipment 102 may be any tangible and/or physical object. Such items/shipments 102 may be picked up and/or delivered by a carrier/transporter. In one embodiment, an item/shipment 102 may be or be enclosed in one or more packages, parcels, bags, containers, loads, crates, items banded together, vehicle parts, pallets, drums, the like, and/or similar words used herein interchangeably. Such items/shipments 102 may include the ability to communicate (e.g., via a chip (e.g., an integrated circuit chip), RFID, NFC, Bluetooth, Wi-Fi, and any other suitable communication techniques, standards, or protocols) with one another and/or communicate with various computing entities for a variety of purposes. For example, the item/shipment 102 may be configured to communicate with a service point device 117 using a short/long range communication technology, as described in more detail below. Further, such items/shipments 102 may have the capabilities and components of the described with regard to the occupancy computing entities 100, networks 105, vehicles 107, distributed computing entities 110, user computing entities 120, and/or the like. For example, the item/shipment 102 may be configured to store item/shipment information/data. In example embodiments, the item/shipment information/data may comprise one or more of a consignee name/identifier, an item/shipment identifier, a service point (e.g., delivery location/address, pick-up location/address), instructions for delivering the item/shipment, an item/shipment delivery authorization code, information/data regarding if a service point device 117 is present at the service point, and/or the like. In this regard, in some example embodiments, an item/shipment may communicate send "to" address information/data, received "from" address information/data, unique identifier codes, and/or various other information/data. In one embodiment, each item/shipment may include an item/shipment identifier, such as an alphanumeric identifier. Such item/shipment identifiers may be represented as text, barcodes, tags, character strings, Aztec Codes, Maxi-Codes, Data Matrices, Quick Response (QR) Codes, electronic representations, and/or the like. A unique item/shipment identifier (e.g., 123456789) may be used by the carrier to identify and track the item/shipment as it moves through the carrier's transportation network. Further, such item/shipment identifiers can be affixed to items/shipments by, for example, using a sticker (e.g., label) with the unique item/shipment identifier printed thereon (in human and/or machine readable form) or an RFID tag with the unique item/shipment identifier stored therein.

4. Exemplary Distributed Computing Entity

Figure 3:
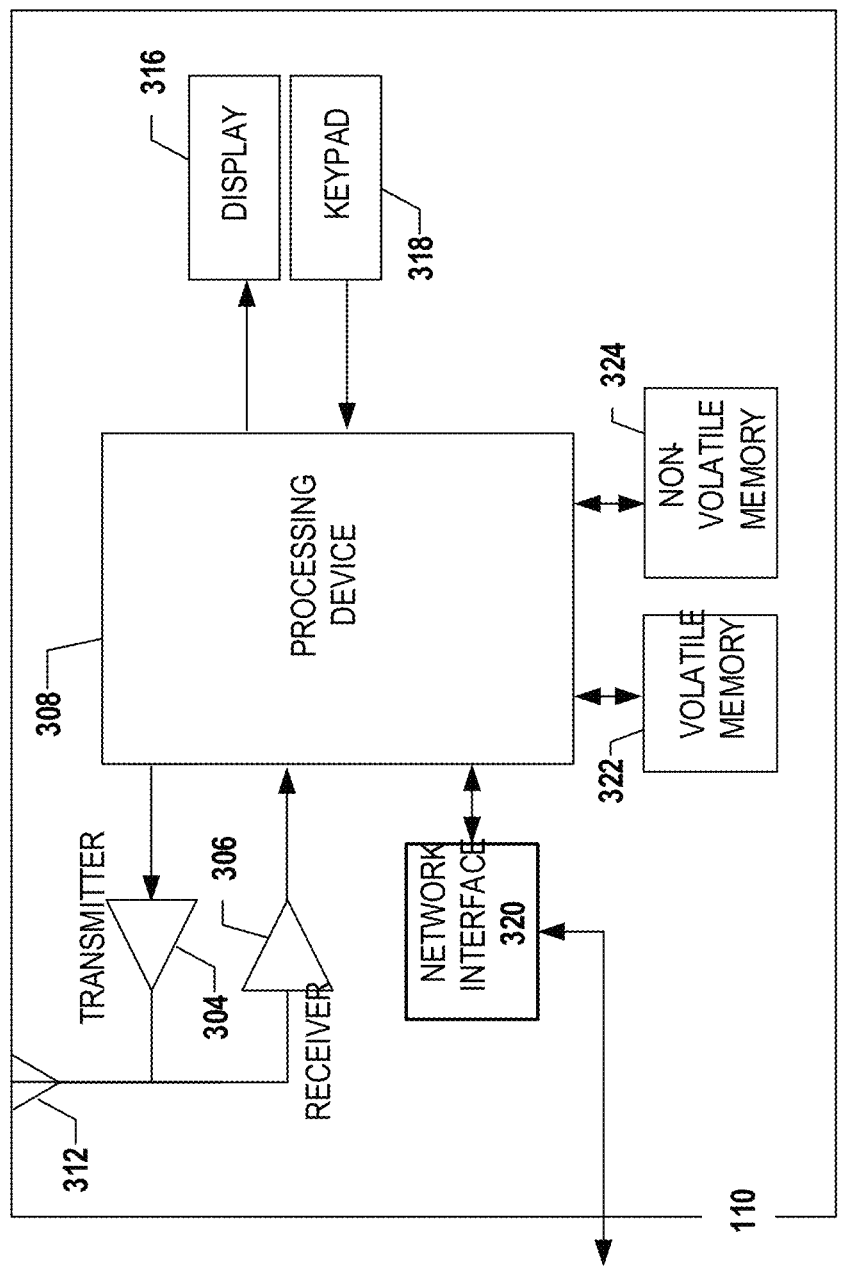
FIG. 3 shows a schematic diagram of an example distributed computing entity according to various embodiments.

FIG. 3 provides an illustrative schematic representative of a distributed computing entity 110 that can be used in conjunction with embodiments of the present invention. In one embodiment, the distributed computing entities 110 may be operated by one or more carrier customers, one or more building managers, one or more municipality property records offices, and/or the like. In certain embodiments, a carrier customer may be a consignor (entity sending an item/shipment 102) or a consignee (intended recipient of an item/shipment 102). In example embodiments, a distributed computing entity 110 may be registered with one or more service point devices 117 (or a service point device 117 may be registered with the distributed computing entity 110) such that the service point device 117 may provide notifications (e.g., doorbell activation notifications) to an individual operating the distributed computing entity 110. In example embodiments, a distributed computing entity 110 may be configured to monitor status information/data generated by the one or more service point devices 117, such as whether a service point device 117 detects the presence of a unit/address/service point occupant. In certain embodiments, the distributed computing entity 110 may be in communication with a plurality of service point devices 117, such as service point devices 117 associated with a plurality of building units (e.g., apartments, condominiums, offices, and/or the like).

In one embodiment, a distributed computing entity 110 may include one or more components that are functionally similar to those of the occupancy computing entity 100, item/shipment 102, vehicle 107, user computing entity 120, and/or the like. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 3, the distributed computing entity 110 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provide signals to and receive signals from the transmitter 304 and receiver 306, respectively.

The signals provided to and received from the transmitter 304 and the receiver 306, respectively, may include signaling information/data in accordance with air interface standards of applicable wireless systems. In this regard, the distributed computing entity 110 may be capable of operating with one or more air interface standards, communication protocols, modulation types, and access types. More particularly, the distributed computing entity 110 may operate in accordance with any of a number of wireless communication standards and protocols, such as those described above with regard to the occupancy computing entity 100. In a particular embodiment, the distributed computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth, USB, Wibree, HomeRF, SWAP, and/or the like. Similarly, the distributed computing entity 110 may operate in accordance with multiple wired communication standards and protocols, such as those described above with regard to the occupancy computing entity 100 via a network interface 320.

Via these communication standards and protocols, the distributed computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The distributed computing entity 110 can also download changes, add-ons, and updates, for instance, to its firmware, software (e.g., including executable instructions, applications, program modules), and operating system.

According to one embodiment, the distributed computing entity 110 may include a location determining aspect, device, module, functionality, and/or similar words used herein interchangeably. For example, the distributed computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire information/data, sometimes known as ephemeris data, by identifying the number of satellites in view and the relative positions of those satellites (e.g., using GPS). The satellites may be a variety of different satellite systems, including LEO satellite systems, DOD satellite systems, the European Union Galileo positioning systems, the Chinese Compass navigation systems, Indian Regional Navigational satellite systems, and/or the like. This information/data can be collected using a variety of coordinate systems, such as the DD; DMS; UTM; UPS coordinate systems; and/or the like. Alternatively, the location information/data can be determined/identified by triangulating the distributed computing entity's 110 position in connection with a variety of other systems, including cellular towers, Wi-Fi access points, and/or the like. Similarly, the distributed computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine/identify the location of someone or something to within inches or centimeters.

The distributed computing entity 110 may also comprise a user interface (that can include a display 316 coupled to a processing element 308) and/or a user input/interaction interface (coupled to a processing element 308). For example, the user interface may be a user application, browser, user interface, and/or similar words used herein interchangeably executing on and/or accessible via the distributed computing entity 110 to interact with and/or cause display of information/data from the occupancy computing entity 100, as described herein. The user input/interaction interface can comprise any of a number of devices allowing the distributed computing entity 110 to receive information/data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the distributed computing entity 110 and may include a full set of alphabetic keys or set of keys that may be activated to provide a full set of alphanumeric keys. In addition to providing input, the user input/interaction interface can be used, for example, to activate or deactivate certain functions, such as screen savers and/or sleep modes.

The distributed computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the distributed computing entity 110. As indicated, this may include a user application that is resident on the entity or accessible through a browser or other user interface for communicating with the occupancy computing entity 100, and/or various other computing entities.

In another embodiment, the distributed computing entity 110 may include one or more components or functionalities that are the same or similar to those of the occupancy computing entity 100, as described in greater detail above. As will be recognized, these architectures and descriptions are provided for exemplary purposes only and are not limited to the various embodiments.

In one embodiment, distributed computing entities 110 may be fixed with regard to their geographic locations, such as by being in fixed positions at apartment buildings, condominium buildings, office buildings, industrial parks, and/or the like. In another embodiment, distributed computing entities 110 may be mobile with regard to their geographic locations. For example, one or more of the distributed computing entities 110 may be handheld devices carried by individuals (e.g., smartphones), handheld devices carried by carrier personnel, mobile devices secured relative to delivery vehicles, and/or the like. As will be recognized, a variety of other approaches and techniques can be used to adapt to various needs and circumstances.

5. Exemplary Service Point Device

Example embodiments provide for interaction with a service point device 117 using wireless communication interfaces as discussed in copending U.S. patent application Ser. No. 15/349,189, which is incorporated herein by reference in its entirety. In particular, the service point device 117 may be an electronic and/or computing device physically located at the service point and/or in and/or affixed to a building or structure located at the service point. Some examples of a service point device 117 include an electronic doorbell (e.g., a Ring.com® doorbell), beacon, storage locker, electronic mailbox, IOT enabled device (e.g., a thermostat (e.g., a Nest® Thermostat, an Ecobee® Thermostat, and/or the like), IOT enabled garage door opener, IOT enabled door lock, IOT enabled light bulb, and/or the like), and/or the like. For example, in one embodiment, the service point device 117 is an interactive, electronic, or "smart" doorbell affixed to the exterior of a residential or commercial unit (e.g., an apartment, office, condominium, and/or the like).

Figure 4:
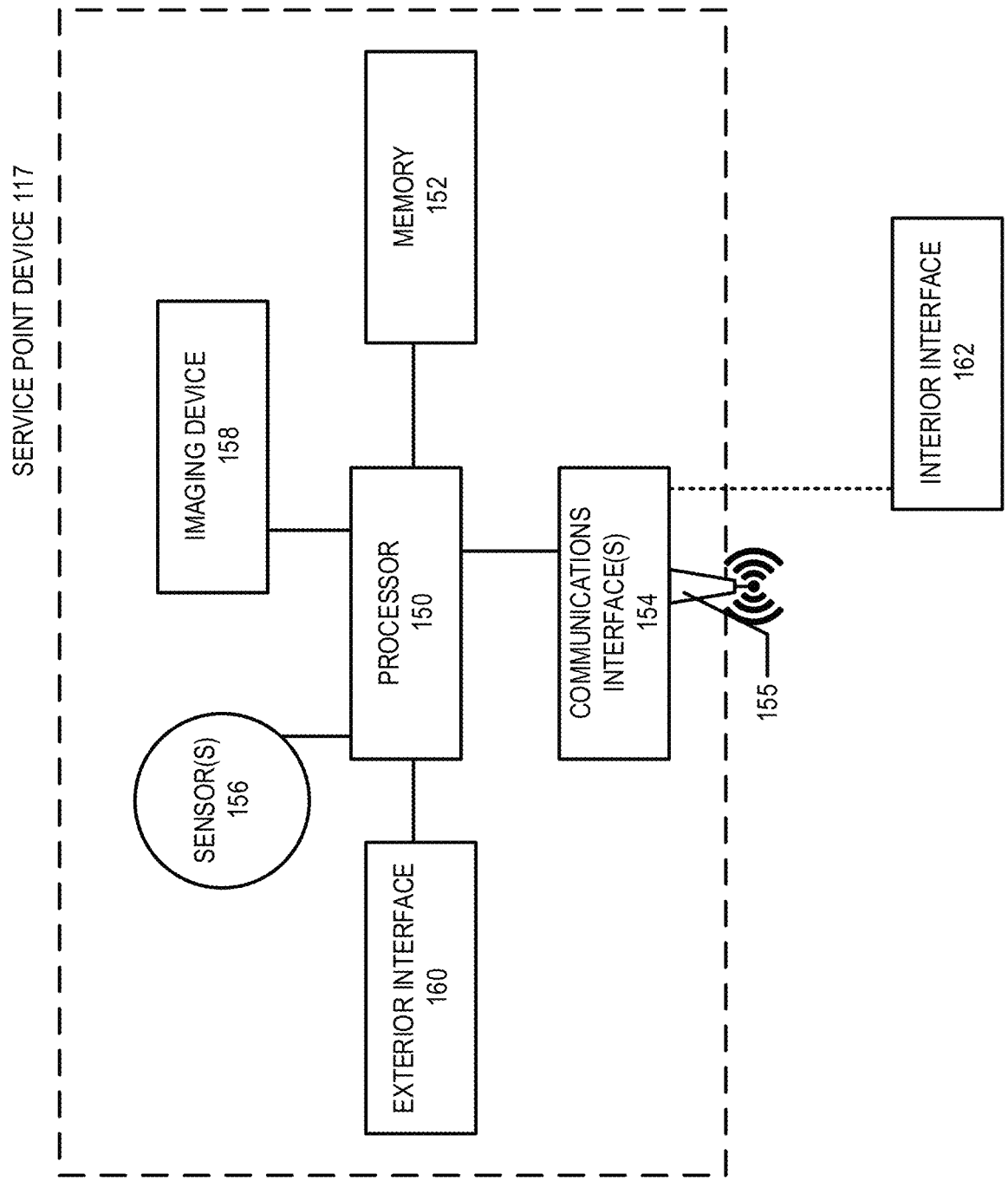
FIG. 4 shows a schematic diagram of an example service point device according to various embodiments.

In example embodiments, a service point device 117 may include one or more components that are functionally similar to those of the occupancy computing entity 100, the distributed computing entity 110, user computing entity 120, and/or the like. FIG. 4 provides a block diagram of an example service point device 117. For example, a service point device 117 may comprise a processor 150, a memory 152 (e.g., volatile and/or non-volatile memory), one more communication interfaces 154, and/or the like. As with other entities, the service point device 117 may include one or more imaging devices 158 (e.g., video cameras and/or still cameras) to capture image data (e.g., pictures, video, and/or the like). The service point device 117 may also include one or more activity or motion detection sensors 156 or capabilities for zones of interest, such as Light Detection and Ranging (LIDAR) sensors, laser-based distance sensors, infrared distance sensors, ultrasonic distance sensors, and/or the like. Moreover, one or more sensor arrays 156 may be configured to detect motion and trigger the imaging devices to collect, capture, and/or store image data.

Additionally, the service point device 117 may be configured to communicate with one or more other computing entities (e.g., distributed computing entity 110, user computing entity 120, and/or the like) via one or more wired or wireless networks (e.g., through a communication interface 154). The service point device 117 may further comprise a communications interface 154 configured to communicate with one or more other computing entities (e.g., user computing entity 120, item/shipment 102, delivery vehicle 107, and/or the like) using a short/long range communication technology (e.g., Bluetooth technology, Bluetooth low energy technology, near field communication (NFC) technology, RFID technology, Wi-Fi technology, ZigBee technology, infrared technology, ultra-wideband technology), and/or any other suitable communication techniques, standards, or protocols. For example, a communications interface 154 may be in communication with one or more antenna 155 configured to receive and/or transmit short/long range communications.

In certain embodiments, the service point device 117 may be in network communication with one or more user computing entities 120 associated with entity (e.g., resident/occupant). The service point device 117 may be configured to detect whether the user computing entity 120 associated with the entity is nearby (e.g., within a wireless communication range of the service point device 117), such that the service point device 117 is configured to detect the presence of the user computing entity 120. In certain embodiments, the service point device 117 may be configured to correlate the detection of the user computing entity 120 with the presence of the associated entity (e.g., resident) at the unit/address/service point associated with the service point device 117. In such embodiments, the service point device 117 may be configured to provide real-time entity status information/data to an occupancy computing entity 100 indicative of whether the entity is located at the unit/address/service point, as discussed in greater detail herein.

In example embodiments, the service point device 117 may comprise an exterior interface 160 and/or comprise and/or be in communication with an interior interface 162. In example embodiments, the exterior interface 160 is located on the exterior of the building or structure located at the service point. In example embodiments, if the service point device 117 is affixed to a building or structure, the exterior interface 160 may be located in the vicinity of the service point device 117 on the exterior of the building or structure. The interior interface 162 may be located anywhere within the building that the service point device 117 is affixed to and/or associated with. In an example embodiment, the interior interface 162 is secured to an interior wall of the building that the service point device 117 is affixed to and/or associated with. In another example embodiment, the interior interface 162 is configured to be moved from room-to-room within the building that the service point device 117 is affixed to and/or associated with. The interior and/or exterior interfaces 160, 162 may comprise one or more speakers or other components configured for producing an audible signal; a keypad (soft or hard) comprising one or more press-able, selectable, and/or otherwise interactive buttons/keys; a display (e.g., configured for displaying at least notifications and/or pictures, video, and/or the like captured by the one or more imaging devices 158 of the service point device 117), and/or the like. In example embodiments, the processor 150 may be in communication with the interior interface 162 via a short/long range communication technology, a wired and/or wireless network, or through a direct wired (e.g., USB, Ethernet, or other data cable) or wireless connection. In some embodiments, the interior interface 162 may be functionally coupled to the processor 150, and/or may be operated by a processing element dedicated to the interior interface 162. As will be recognized, these architectures and descriptions are provided for exemplary purposes only and are not limited to the various embodiments.

6. Exemplary User Computing Entity

In one embodiment, a user computing entity 120 may be operated by carrier/transporter personnel/operator (e.g., picking up and/or delivering items/shipments to customers). The user computing entity 120 may be a handheld/mobile computing entity, such as a PDA, a smart phone, an autonomous vehicle, and/or the like. In one embodiment, a user computing entity 120 may include one or more components that are functionally similar to those of the occupancy computing entity 100, the distributed computing entity 110, and/or the like. For example, in one embodiment, each user computing entity 120 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, interface, and/or similar words used herein interchangeably executing on and/or accessible via the user computing entity 120 to interact with and/or cause display of information, as described herein. This may also enable the user computing entity 120 to communicate with various other computing entities, such as carrier/transporter computing entities, distributed computing entities 110, and/or various other computing entities. As will be recognized, these architectures and descriptions are provided for exemplary purposes only and are not limited to the various embodiments.

7. Exemplary Distributed Ledger System (e.g., Blockchain)

In certain embodiments, a distributed ledger system may store information/data indicative of various transactions occurring between multiple computing entities (e.g., multiple transaction computing entities). The distributed ledger system may be embodied as a blockchain ledger system, comprising a plurality of "blocks" each representing a discrete transaction occurring between computing entities. Each block may comprise information/data linking to a previous generated block, thereby providing a complete chain between the generation of information/data stored in the distributed ledger and the later use of the same information/data (e.g., to establish a complete chain-of-possession of information/data). The distributed ledger system may comprise one or more Ethereum-based blockchains, Hyperledger blockchains, and/or the like. The distributed ledger system may incorporate a single blockchain configured for storing all transactions therein, or the distributed ledger system may comprise a plurality of blockchains, wherein each blockchain is utilized to store information/data indicative of a particular type of transaction. For example, a first blockchain may be configured to store parcel tracking information/data, and a second blockchain may be configured to store value transfer information/data (e.g., via a virtual currency).

The distributed ledger system may be stored in and/or by one or more computing entities (e.g., occupancy computing entity 100) in complete or partial form. For example, each of a plurality of computing entities may store a complete copy of the one or more blockchains, and may be utilized for backup protection and/or transaction verification purposes. The distributed ledger system may be publicly accessible, and may be distributed among a plurality of commercial computing entities (e.g., servers), user computing entities (e.g., desktop computers, laptop computers, and/or the like), and/or the like. However, in certain embodiments, the distributed ledger system may be privately accessible, and may be stored by one or more computing entities controlled by a single entity. In the latter embodiments, access to information/data stored in the distributed ledger may be limited to users having defined credentials (e.g., a private key, a passcode, and/or the like). In certain embodiments, information/data stored in the distributed ledger system may be hashed, encrypted, or otherwise protected from unauthorized access (e.g., read access and/or write access). The substantive information/data stored in the distributed ledger system may be accessible utilizing a private key to decrypt the stored information/data, or the substantive information/data may be inaccessible based on information/data stored in the distributed ledger.

In various embodiments, each block of a blockchain stored in the distributed ledger may comprise location-identifying information/data and/or entity identifying information/data (e.g., occupancy information/data for a particular entity), and may represent a moving event for the corresponding entity. For example, each time an entity changes occupancy from one location to another, the distributed ledger system may be configured to generate a new block providing information/data indicative of the transaction. In certain embodiments, each block may comprise at least a portion of the entity information/data, thereby providing a link back to a prior block representing a transaction involving the same entity information/data.

IV. Exemplary System Operation

As noted above, various embodiments are directed to the implementation and/or maintenance of an occupancy database comprising occupancy information/data for a plurality of entities within a plurality of units (e.g., apartments, condominiums, houses, offices, and/or the like). The occupancy database may be in communication with a plurality of distributed computing entities 110, thereby forming an automatically updating system for maintaining real-time (or near real-time) occupancy information/data that is self-verified based on information/data accessible via at least a subset of the distributed computing entities 110.

The self-updating occupancy system (including the occupancy database), may comprise information/data regarding the current status of various entities relative to corresponding units/addresses/service points (e.g., available/unavailable information/data), connectivity information/data for various service point devices at the corresponding units/addresses/service points, and/or the like. The stored information/data may be available to various user computing entities 120 such as those carried by carrier delivery personnel, thereby facilitating connectivity between the user computing entity 120 and various computing entities at the corresponding units/addresses/service points of an entity. In certain embodiments, the information/data accessible to the user computing entities may facilitate delivery of various shipments/items 102. For example, through connectivity with various service point devices at a particular unit/address/service point (as facilitated by information/data stored in the occupancy database), various embodiments may enable automated electronic delivery confirmation signatures, electronic delivery attempt notifications, and/or the like to be implemented during delivery as discussed in co-pending U.S. patent application Ser. No. 15/349,189, filed on Nov. 11, 2016 and which is incorporated herein by reference in its entirety.

1. Service Points

In example embodiments, a service point may be a delivery location, pick-up location, or other location at which a delivery vehicle and/or driver are to provide a service on behalf of the carrier. In one embodiment, a "service point" may be any identifiable location, such as one or more addresses, delivery locations, parking locations, sidewalks, highways, trails, alleys, paths, walkways, streets, street segments, entrance or exit ramps, roads, longitude and latitude points, geocodes, zip codes, area codes, territories, cities, counties, states, provinces, countries, stops (e.g., pick up stops, delivery stops, vehicle visits, stops), geofenced areas, geographic areas, landmarks, buildings, bridges, and/or other identifiable locations. For example, a service point may be a residential location, such as one or more homes, one or more mobile homes, one or more apartments, one or more apartment buildings, one or more condominiums, one or more townhomes, one or more points at such locations, and/or the like. The service point may also be any specific location at a residential location, e.g., (e.g., front door of a residence, side door of a residence, and/or the like). A service point may also be a commercial location, such as one or more stores in a mall, one or more office buildings, one or more office parks, one or more offices of an apartment complex, one or more garages, one or more warehouses, one or more restaurants, one or more stores, one or more retail locations, one or more points at such locations, and/or the like. The service point may also be any specific location at a commercial location, e.g., (e.g., front door of a commercial location, dock of a commercial location, and/or the like). A service point may be one or more streets, one or more street segments, one or more zones, one or more areas, one or more latitude and/or longitude points (e.g., 33.7869128, −84.3875602), one or more geocodes, and/or the like. A service point may be any identifiable location. As will be recognized, a variety of approaches and techniques can be used to adapt to various needs and circumstances.

2. Exemplary Occupancy Database

The occupancy database may be embodied as a storage memory in electronic communication with the occupancy computing entity 100. The occupancy database may be maintained publicly by a single entity (e.g., a carrier, a government agency, and/or the like), a distributed plurality of entities (e.g., as a distributed ledger or blockchain), and/or the like. In other embodiments, the occupancy database may be maintained privately by a single entity (e.g., an apartment building management company, a carrier, an identity verification company, and/or the like) or a distributed consortium of entities (e.g., a plurality of carriers, a plurality of private companies, and/or the like). Accordingly, the occupancy database may be associated with a single location (e.g., a single apartment building) or the occupancy database may be associated with a plurality of locations. Moreover, the occupancy database may be embodied as a centrally stored and managed database (e.g., within local memory of the occupancy computing entity 100, or within local servers associated with the occupancy computing entity 100), as a cloud-based database (e.g., stored within external, network-connected storage devices), as a distributed database (e.g., stored on a plurality of network-connected storage devices), and/or the like.

In certain embodiments, at least portions of the occupancy database may be downloaded (e.g., temporarily downloaded) onto a user computing entity 120 and/or a distributed computing entity 110. For example, selected entity profiles (described in greater detail herein) may be downloaded onto a user computing entity 120 corresponding to an item/shipment delivery personnel and/or autonomous delivery vehicle such that occupancy information/data corresponding to upcoming item/shipment deliveries may be easily accessible via local memory of the user computing entity 120.

As discussed herein, the information/data stored within the occupancy database may be available via a network (e.g., the internet), and thus any of a variety of network connected computing entities may be configured to access information/data stored within the occupancy database. In certain embodiments, the information/data stored within the occupancy database may be stored using a unique or proprietary file type, storage organization, and/or the like, and accordingly the stored information/data may be available to computing entities operating specially configured computing programs (e.g., standalone computing programs and/or multi-function computing programs incorporating occupancy database accessibility therein) configured to read and/or execute information/data stored within the occupancy database. However, the information/data stored within the occupancy database according to various embodiments may be stored in browser-executable file types, such as HTML, HTML5, PHP, and/or the like, and may therefore be accessible via any of a variety of computing entities via a browser program directed to a web-based interface (e.g., hosted by the occupancy computing entity 100).

In certain embodiments, various computing entities (e.g., distributed computing entities 110, user computing entities 120, and/or the like) may be configured to access various portions of the occupancy data to enable users to review and/or update various portions of information/data stored within the occupancy database. For example, users may be enabled to access (e.g., read/write access) stored entity profiles comprising information/data about themselves, while carrier computing entities may be configured to access (e.g., read-only access) information/data regarding a plurality of entity profiles.

The information/data stored in the occupancy database may be organized into a plurality of entity profiles each corresponding to a particular entity (e.g., a business, an individual, a family, and/or the like). FIG. 4 illustrates example information/data stored in an entity profile corresponding to a fictional individual named John Doe. As shown in FIG. 4, the entity profile may comprise information/data identifying a current residence/shipping address of the corresponding entity (e.g., street address, including unit number, if applicable; P.O. Box address, and/or the like). Although not shown, the entity profile may comprise information/data corresponding to a plurality of current residences/shipping addresses for the entity (e.g., including a primary residence and/or a plurality of secondary residences).

Moreover, as shown in FIG. 4, the entity profile may comprise information/data identifying a plurality of historical addresses corresponding to the entity. These historical addresses may be stored as unique entries in an individually stored entity profile, or the historical address information/data may be stored in a plurality of previous-in-time generated blocks in a blockchain based occupancy database. In the latter exemplary embodiments, historical address information/data need not be individually stored and/or maintained within the occupancy database, but instead may be accessed as needed by retrieving information/data stored in a prior-generated block. As discussed in greater detail herein, the occupancy database may be configured to automatically move a "current" address corresponding to an entity to the "previous" address portion of the entity profile upon a determination that the entity has updated a current address information/data stored in the entity profile.

As shown in FIG. 4, the entity profile may comprise additional information/data corresponding to a particular entity. For example, the entity profile may comprise contact information/data for the entity (e.g., phone number, social network contact information, email address, and/or the like). The entity profile may additionally comprise connection information/data that may be used to establish a wireless data connection with one or more service point devices 117 located at one or more addresses corresponding to the entity. The connection information/data may comprise one or more executable programs that may be utilized by an accessing computing entity (e.g., a user computing entity 120) without additional user input by a user of the accessing computing entity. Thus, upon being brought within a connectivity range associated with the serviceable point device 117 (which may be determined based on the wireless transmission protocol utilized by the serviceable point device 117), the accessing computing entity may be configured to automatically establish a wireless data communication interface with the serviceable point device 117. As yet other examples, the connection information/data may comprise information/data identifying a type of communication protocol utilized by the serviceable point device 117, and one or more passphrases, virtual handshake information, validation criteria, and/or the like utilized by the serviceable point device 117 to establish connection therewith. A user computing entity 120 accessing the entity profile may be configured to execute one or more locally stored computing programs to utilize the connection information/data to establish a wireless connection interface with the serviceable point device 117 once available. Via the locally stored computing program, the user computing entity 120 may be configured to determine an expected communication range for the serviceable point device 117 based on connection information/data stored in the entity profile. Upon detecting that the user computing entity 120 is within the expected communication range for the serviceable point device 117, the user computing entity 120 may begin searching for wireless connectivity signals transmitted by the serviceable point device 117 (e.g., the user computing entity 120 may enter a listening mode to listen for signals generated by the serviceable point device 117, and/or the user computing entity may generate and transmit one or more ping signals to the serviceable point device 117). Upon detecting the serviceable point device 117, the user computing entity 120 may initiate establishing a wireless communication interface using the authorization credentials stored in the entity profile. Thereafter, the user computing entity 120 may transmit and/or receive information/data with the serviceable point device 117, as discussed in greater detail herein.

With reference again to FIG. 4, the entity profile may additionally include status information/data for the entity. The status information/data may indicate whether the entity is available to accept delivery of an item/shipment 102 (e.g., whether an individual associated with the entity is located at the current address associated with the entity to accept delivery of the item/shipment 102). In certain embodiments, the status information/data may be generated by one or more of the serviceable point devices 117 (e.g., based on wireless connectivity status with user computing entities 120 carried by individuals associated with the entity), and may be transmitted to the occupancy computing entity 100 (e.g., via one or more distributed computing entities 110 in communication with the serviceable point devices 117) in real-time or near real-time to maintain accurate and current status information/data for the entity profile. As noted above, the service point devices 117 may be configured to wirelessly communicate with various user computing entities 120 associated with an occupant/resident/entity associated with the serviceable point. Upon detecting the presence of the user computing entity 120 (e.g., based on an established wireless communication interface between the service point device 117 and the user computing entity 120), the service point device 117 may be configured to transmit (in real-time or near real-time) status information/data indicating the presence of the entity. Thus, the establishment or loss of a wireless communication interface between the service point device 117 and a user computing entity may be a trigger event for the service point device 117 to transmit updated status information/data to the occupancy computing entity 100. For example, upon establishing a wireless communication link with an entity's user computing entity 120, the service point device 117 may transmit updated status information/data to the occupancy computing entity 100 indicating the entity is available at the unit/address/service point. Likewise, upon detecting a loss of wireless connectivity with the entity's user computing entity 120 (e.g., upon the user computing entity 120 leaving a wireless communication range with the service point device 117), the service point device 117 may be configured to transmit updated availability information/data to the occupancy computing entity 100 indicating the entity is unavailable at the unit/address/service point.

In certain embodiments, the entity profile may additionally comprise service provider preferences established by the entity associated with the entity profile. As one non-limiting example, the service provider preferences may comprise delivery preferences for item/shipment deliveries to be made to an address associated with the entity profile. These delivery preferences may be provided by an entity associated with the entity profile (e.g., via user input provided to a distributed computing entity 110 and transmitted to the occupancy computing entity 100), and may establish preferences such as "leave at" instructions for leaving an item/shipment 102 at the address, redirect instructions for delivering an item/shipment 102 to an alternative location if delivery to the address included in the entity profile is not possible.

In various embodiments, the information/data stored within the entity profile may be encrypted (e.g., using a private and/or public key), hashed, and/or otherwise secured against unauthorized access to the stored information/data. In such embodiments computing entities (e.g., user computing entities 120, distributed computing entities, occupancy computing entity 100, and/or the like) may store an encryption key, hashing algorithm, and/or the like configured to enable the computing entity to retrieve information/data from the entity profile and/or to verify information/data against that information/data stored in the entity profile.

In certain embodiments, at least portions of the information/data stored in the occupancy database may be linked with a carrier-specific address database and/or item/shipment database for various users and/or items/shipments 102, and/or with a carrier loyalty program that provides users with the ability to provide carrier-specific instructions for various items/shipments 102 to be delivered to those users. In such embodiments, the carrier-specific address database (or other carrier-specific database) may be maintained by the carrier, and may be configured to cross-link information/data stored in the occupancy database. In certain embodiments, the carrier address database may be provided with read-only information/data access to at least a portion of the occupancy database (e.g., at least those entity profiles corresponding to user/address profiles stored in the carrier address database). However, in certain embodiments the carrier address database may have read/write access to the occupancy database, such that information/data stored within the carrier address database may be utilized to maintain up-to-date information/data stored in the occupancy database.

When linked with a carrier address database (or other carrier-specific systems), the information/data stored in the occupancy database may be utilized to supplement delivery information/data for shipments/items 102 destined for various entities. For example, the carrier address database may comprise information/data corresponding to future and/or in-transit shipments/items 102 destined for various entities. In such embodiments, the carrier address database may (e.g., via a distributed computing entity 110) verify that address information/data for each item/shipment 102 is correct and complete. Upon determining that address information/data for a particular item/shipment 102 is incomplete, the carrier address database may supplement the address information/data for the item/shipment 102 to provide a complete address to facilitate final delivery of the item/shipment 102.

To verify address information/data corresponding to a particular item/shipment 102, the carrier address database may generate a query to the occupancy database comprising identifying information for a particular destination location associated with the item/shipment 102. For example, the carrier address database may provide a unique combination of recipient name, recipient street name, recipient street number, recipient city, recipient state, recipient country, recipient zip/postal code, recipient user name, recipient social security number, and/or the like. The carrier address database need not provide complete address information/data (e.g., the provided information/data may be missing a unit number, may have an incorrectly spelled street name, and/or the like), but need only provide sufficient information/data to identify the recipient of the item/shipment 102. The occupancy computing entity 100 may receive the generated query, and may retrieve a corresponding entity profile from the occupancy database corresponding to the unique combination of information/data provided by the carrier address database. The occupancy computing entity 100 may then generate and transmit a response to the carrier address database indicative of a correct destination address for the particular item/shipment 102. The response may identify errors and/or omissions in the information/data provided by the carrier address database, and the carrier address database may be configured to update the shipping information/data for the item/shipment 102 to reflect the correct and complete address information/data. In certain embodiments, the corrected address information/data provided by the occupancy computing entity 100 may reflect an entirely new address for the entity, for example, upon determining that the item/shipment recipient has moved away from an address provided by the carrier address database and to a new address. Accordingly, the carrier address database may be configured to automatically redirect/forward shipments/items 102 to an updated address corresponding to an item/shipment recipient based at least in part on information/data received from the occupancy computing entity 100.

The occupancy information/data stored in the occupancy database may be maintained as up-to-date in real-time or near real-time based on updated occupancy information/data received from one or more distributed computing entities 110. The distributed computing entities 110, which may comprise property management computing entities (e.g., apartment management computing entities, condominium management computing entities, office building management computing entities, and/or the like), municipal property records computing entities, user computing entities, third party computing entities (e.g., computing entities maintained by the United States Postal Service), and/or the like, may be location specific and may correspond to a single property, or may correspond to a plurality of properties in a particular area. The plurality of distributed computing entities 110 collectively define a network of computing entities maintaining occupancy information/data for a plurality of entities at various locations. Each of these plurality of distributed computing entities may provide updated occupancy information/data (e.g., comprising information/data indicative of a location change for the entity and/or an effective date for the location change) to the occupancy database regularly, periodically, and/or as new information/data is generated. For example, various location-specific distributed computing entities 110 may be configured to generate new occupancy information/data as new residents, occupants, and/or the like move into the location corresponding to the particular distributed computing entity 110. As a specific example, for a distributed computing entity 110 embodied as an apartment complex management computing entity, the distributed computing entity 110 may be configured to receive new occupancy information/data whenever a new resident joins the apartment complex. The distributed computing entity 110 may thus be configured to compile occupancy information/data regarding those new residents (in a format acceptable to the occupancy database), and may transmit the occupancy information/data to the occupancy database. In certain embodiments, the distributed computing entities may be configured to transmit the information/data to the occupancy database through an application programming interface (API) to ensure information/data is appropriately provided to the occupancy database. However, it should be understood that the information/data may be provided from the various distributed computing entities 110 to the occupancy database via any of a variety of information/data exchanges.

As yet another example, for distributed computing entities 110 embodied as municipal property management computing systems, new occupancy information/data may be generated and/or transmitted to the occupancy database upon receipt of information/data indicating that a piece of property tracked by the municipal property management computing system has been transferred, leased, and/or the like. In such embodiments, the distributed computing entity 110 may transmit occupancy information/data to the occupancy database in a format acceptable to the occupancy database in a manner similar to that discussed above.

As another specific example, for a distributed computing entity 110 embodied as a USPS controlled computing entity, new occupancy information/data may be generated and/or transmitted to the occupancy database upon receipt of mail forwarding information/data at the USPS for a particular entity. For example, after an individual submits a mail forwarding request to reflect a chance in residence, data indicative of the changing residence information/data may be transmitted/provided to the occupancy database for storage with the entity profile corresponding to the individual. Such information/data may also comprise an effective date for the change in occupancy for the individual submitting the forwarding request.

As yet another example, distributed computing entities 110 and/or user computing entities 120 corresponding to individual entities may be utilized to update and/or generate new occupancy information/data for those individual entities. For example, individual entities may provide updated occupancy information/data (e.g., via user input) through a user interface configured to provide updated occupancy information/data to the occupancy database.

The occupancy database may comprise aspects for verifying occupancy information/data provided to the occupancy database. These verification aspects may be embodied as computer program portions stored in the occupancy database and operable by the occupancy computing entity 100 to direct the operation of a plurality of computing entities (including the occupancy computing entity 100 and one or more distributed computing entities 110). Because the location-specific distributed computing entities 110 may, in certain embodiments, comprise the most up-to-date information/data concerning the occupancy of various entities, the verification computing programs may utilize information/data stored in a variety of distributed computing entities 110 to verify information/data stored on the occupancy database. The occupancy computing entity 100 may be configured to verify occupancy information/data once received, and before updating the occupancy database to reflect the newly received occupancy information/data.

Figure 6:
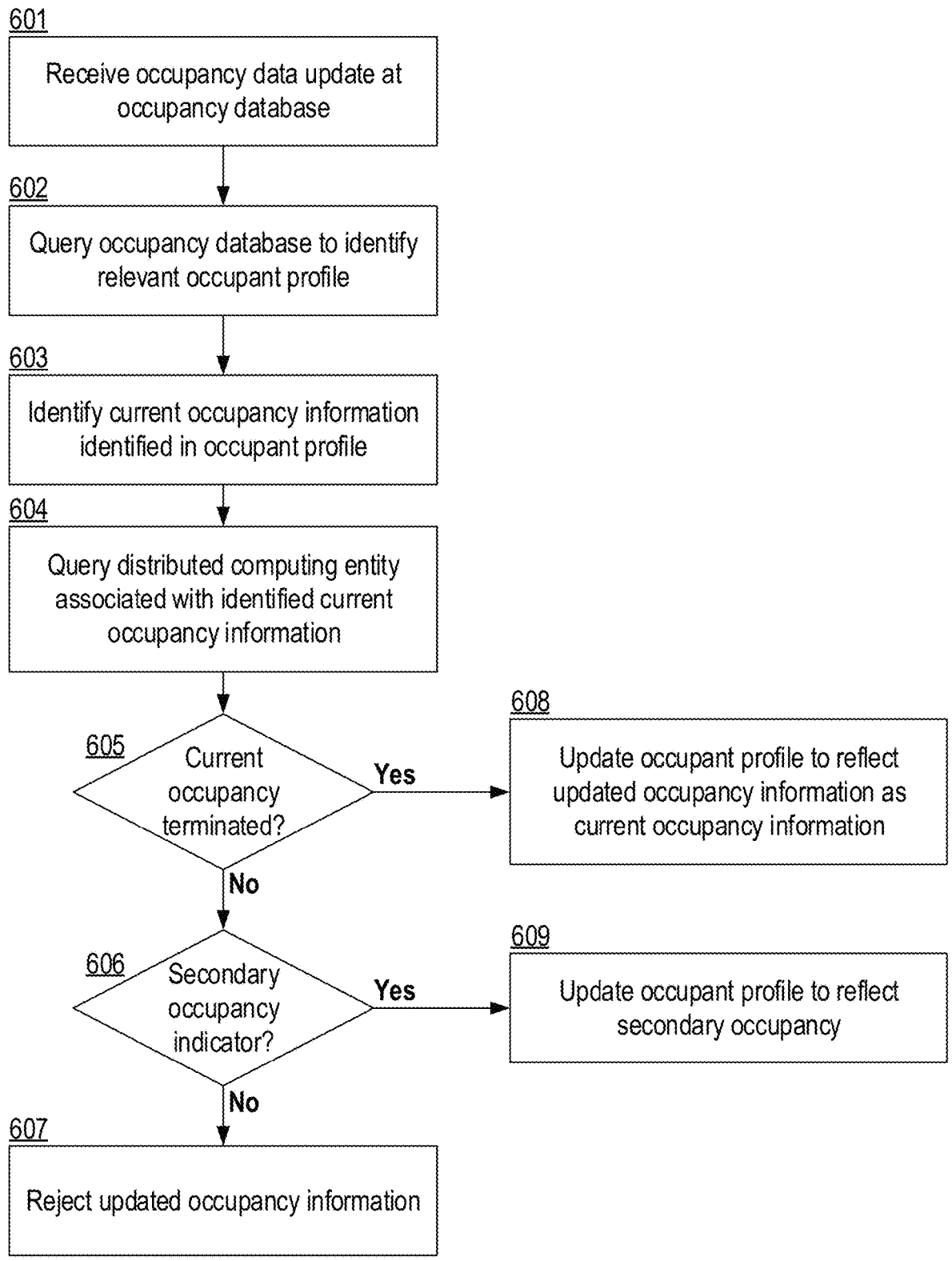
FIG. 6 is a flowchart showing an example process for updating an entity profile according to various embodiments.
Figure 7:
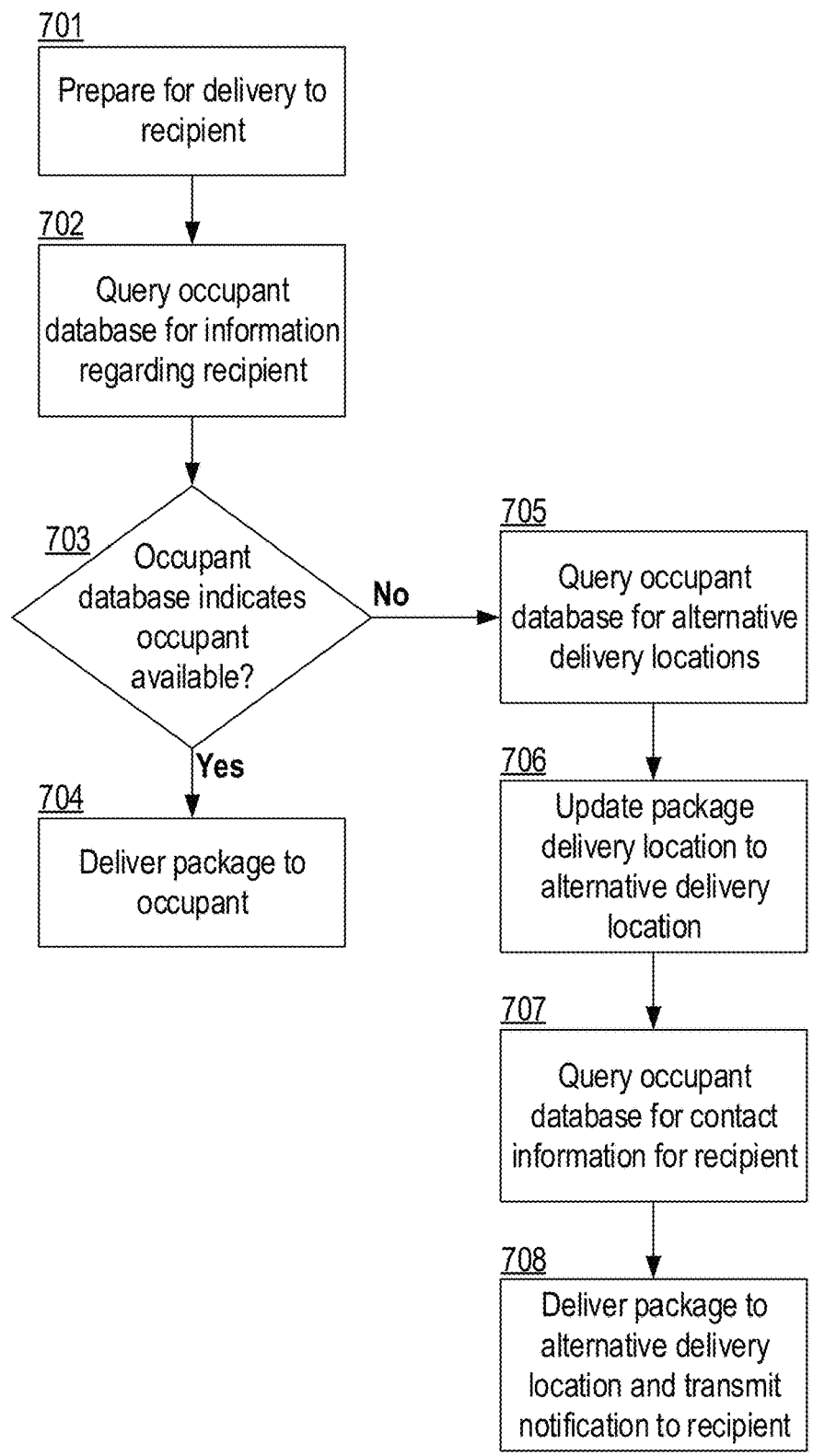
FIG. 7 is a flowchart showing an example process for delivering an item/shipment according to a determined status of an item/shipment recipient according to various embodiments.
Figure 8:
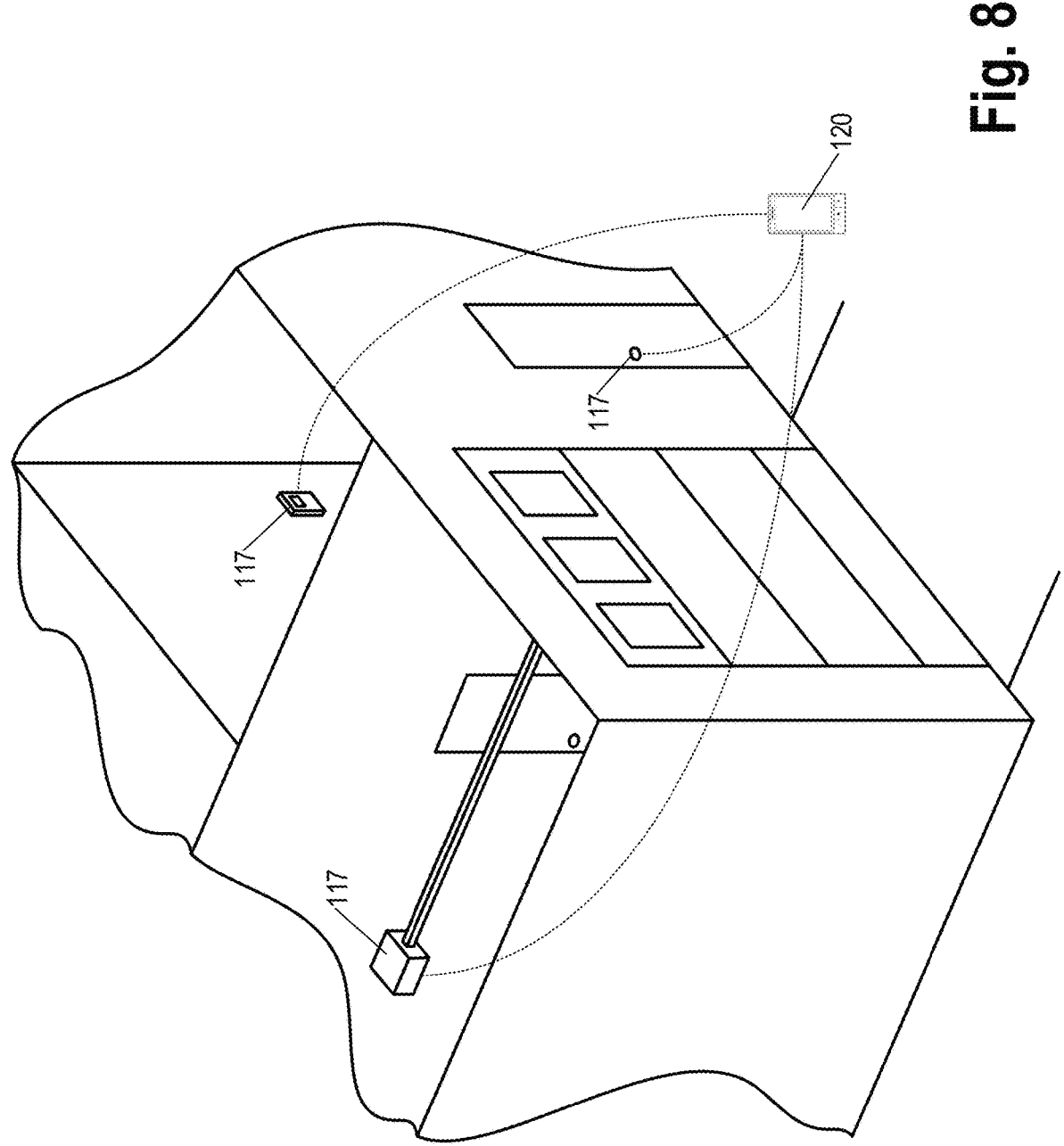
FIG. 8 shows a schematic diagram of a user computing entity wirelessly communicating with one or more service point devices at a delivery location according to various embodiments.

FIG. 6 is a flowchart illustrating example steps for verifying occupancy information/data for a particular entity. As mentioned, new and/or updated occupancy information/data may be generated and transmitted from various distributed computing entities 110, for example, when entities become associated with a new distributed computing entity 110 (e.g., when an entity joins a new building, complex and/or the like managed by a single distributed computing entity 110). The new and/or updated occupancy information/data may be transmitted to the occupancy computing entity 100 from a distributed computing entity 110 associated with the new occupancy location for storage in the occupancy database. Receipt of the new and/or updated occupancy information/data by the occupancy computing entity 100 (as indicated at Block 601) may trigger initiation of the verification process of the occupancy computing entity 100.

The verification process may begin by identifying relevant portions of the new and/or updated occupancy information/data that may be utilized to generate a query to the occupancy database to retrieve a corresponding entity profile for the entity associated with the new occupancy information/data, as indicated at Block 602 of FIG. 6. For example, if the updated occupancy information/data indicates that a particular resident has moved into a new apartment building, the verification process may be configured to identify information/data within the updated occupancy information/data that may be utilized to identify an existing entity profile corresponding to the new resident (e.g., name, prior address information, social security number, and/or the like). The occupancy computing entity 100 may then retrieve the corresponding entity profile for the entity, to retrieve information/data regarding the previously identified current occupancy information/data for the entity as indicated at Block 603. Referring to the previous example, once the entity profile is retrieved for the new apartment resident, the occupancy computing entity 100 identifies stored occupancy information/data within the entity profile identifying the current residence of the new resident as identified in the entity profile. Because the entity profile has not yet been updated to reflect the resident's recent move to the new apartment building, the stored occupancy information/data of the entity profile indicates that the resident still resides at the resident's prior apartment.

The verification process continues by identifying a distributed computing entity 110 associated with the entity's prior stored occupancy information/data (e.g., a resident's prior apartment building). The occupancy computing entity 100 may be configured to review metadata stored with the prior occupancy information/data, or to identify other information/data stored within the occupancy database that may be utilized to identify a distributed computing entity 110 associated with the entity's prior occupancy information/data. With reference again to the new-resident example above, the occupancy computing entity 100 may be configured to identify an apartment management computing entity associated with the resident's prior apartment building (e.g., the apartment management computing entity that provided the previous update information/data to the occupancy computing entity 100 for the resident).

The occupancy computing entity 100 may then generate and transmit a query to the identified distributed computing entity 110 associated with prior occupancy information/data to determine whether the identified entity has vacated a unit/address/service point associated with the prior distributed computing entity 110, as indicated at Block 604. For example, the occupancy computing entity 100 may generate and transmit a query to the resident's prior apartment management computing entity to determine whether the resident has vacated and/or will vacate an apartment at the previous building. The distributed computing entity 110 may then provide information/data to the occupancy computing entity 100 indicating whether the resident has vacated the prior apartment, has provided written notice of an intent to vacate, and/or the like, as indicated at Block 605.

Upon receipt of information/data from the identified distributed computing entity 110 associated with prior occupancy information/data for the entity, the occupancy computing entity 100 may be configured to verify the newly provided updated occupancy information/data and may update the corresponding entity profile for the entity to reflect the new occupancy information/data, as shown at Block 608. The occupancy computing entity 100 may additionally move the previously identified current/stored occupancy information/data in the entity profile to the prior-occupancy information/data portion of the entity profile. Thus, in the prior example, once the occupancy computing entity 100 receives the verification information/data from the identified distributed computing entity 110 associated with the resident's prior apartment complex, the occupancy computing entity 100 may update the resident's entity profile to reflect the new apartment building as the resident's current abode, and to reflect the prior apartment complex as one of the resident's prior addresses.

However, if the distributed computing entity 110 associated with the entity's prior occupancy does not provide verification information/data (e.g., the entity is still reflected as a current occupant of the prior location according to information/data stored at the distributed computing entity 110), the occupancy computing entity 100 may be configured to generate and transmit an alert notification to the distributed computing entity 110 associated with the new occupancy location. The alert notification may request additional information, such as automatically and/or manually generated information/data indicating whether the new occupancy information/data reflects a secondary occupancy (e.g., a secondary home, a secondary business location, and/or the like), whether the new occupancy information/data has an expected overlap with a prior occupancy information/data, and/or the like. The distributed computing entity 110 may be configured to accept user input indicating manual overrides of the generated alert notification, and/or may be configured to automatically generate a response to provide additional information/data in response to the alert notification as indicated at Block 606. If additional information/data is provided to override the alert notification (e.g., upon generation of a secondary occupancy indicator), the occupancy computing entity 100 may update the occupant profile as indicated at Block 609. If the distributed computing entity 110 associated with the new occupancy information/data does not provide additional information/data in response to the alert notification, the occupancy computing entity 100 may reject the proposed updated occupancy information/data and may not update the corresponding entity profile, as indicated at Block 607.

3. Registration

In example embodiments, an entity may register and/or establish an entity profile to be stored in the occupancy database. The entity profile may be generated in response to affirmative action of the entity to provide information/data for the entity profile (e.g., via input provided to a user interface) and/or the entity profile may be generated in response to a passive action on the part of the entity (e.g., purchasing a home, leasing an apartment, leasing an office, purchasing an office building, and/or the like). The generated entity profile may identify an address corresponding with the entity (e.g., a delivery/pick-up address) at a particular service point. Moreover, upon registration and generation of an entity profile, the entity profile may be updated to include information/data indicative of various service point devices 117 located at the service point.

In one embodiment, as part of the enrollment/registration process, the customer (e.g., operating a distributed computing entity 110) may be requested to provide biographic and/or geographic information/data by the occupancy computing entity 100 (e.g., via a registration module). Such information/data may be manually input or provided by allowing access to other accounts, such as Facebook, Gmail, Twitter, PayPal, and/or the like. As yet other examples, such information/data may be provided automatically, and may be populated based on information/data provided to a distributed computing entity 110 during the purchase and/or lease process associated with a particular unit/address/service point. For instance, the customer may provide the customer's name, such as a first name, a last name, a company name, an entity name, and/or an organization name. The customer (e.g., consignor or consignee) may also provide any aliases associated with the customer. For instance, if the customer (e.g., consignor or consignee) were an individual named Joseph Brown, the customer (e.g., consignor or consignee) may provide Joe Brown or Joey Brown as aliases.

In example embodiments, biographic and/or geographic information/data may further comprise information/data relating to a service point device 117 located at an address associated with the customer. For example, in addition to providing the street address for a physical address associated with the customer, the customer may further provide an indication of whether the physical address is associated with a service point device 117. For example, the customer may indicate that a service point device 117 is located at the primary residential address of 100 Main St Atlanta, Ga. 30309, USA. The customer may then provide any information/data required for remote communication with the service point device 117 located at the indicated address. For example, the customer may indicate one or more modes of communication by which the service point device 117 is capable of communicating, an internet protocol (IP) address associated with and/or assigned to the service point device 117, a name associated with the service point device 117 (e.g., Brown Family's doorbell), and/or other information/data needed to facilitate remote communication with the service point device 117. In certain embodiments, the information/data provided regarding the service point device 117 may comprise one or more one-time-use connectivity passwords associated with the service point device 117. In example embodiments, the customer may further provide preferences for use of the service point device 117.

In one embodiment, once the occupancy computing entity 100 receives the necessary biographic and/or geographic information/data from the entity, the occupancy computing entity 100 may perform one or more validation operations.

For example, the occupancy computing entity 100 may determine whether the primary address (and/or other addresses) in the specified country or postal code is eligible for a customer pick-up, delivery, and/or returns programs. The occupancy computing entity 100 may also determine whether the primary address (and/or other addresses) is valid, e.g., by passing the primary address through one or more address cleansing and/or standardization systems. The occupancy computing entity 100 may perform a variety of fraud prevention measures as well, such as determining whether the entity (e.g., consignor or consignee) or one of the entity's addresses has been "blacklisted" from customer pick-up, delivery, and/or returns programs. As will be recognized, a variety of other approaches and techniques can be used to adapt to various needs and circumstances.

In one embodiment, the occupancy computing entity 100 may create a customer profile for the customer via the enrollment/registration process. Accordingly, the occupancy computing entity 100 may create and store various customer profiles (e.g., via a database stored, for example, in non-volatile memory 210). In addition to at least the information/data described above, a customer profile may include one or more corresponding usernames and passwords. As will be recognized, each of the physical addresses may be associated with the customer's profile.

In one embodiment, once a customer profile has been created by the occupancy computing entity 100, the entity (e.g., operating a distributed computing entity 110) can provide various preferences associated with service calls to the entity's associated service point to the occupancy computing entity 100 via an interface, for example. For instance, the entity (e.g., operating a distributed computing entity 110) can provide a variety of preferences, such as communication preferences, service schedule preferences, delivery preferences, delivery options, delivery redirect options, remote activation preferences, and/or delivery instructions. The entity (e.g., operating a distributed computing entity 110) may also update any information/data through the appropriate interface (e.g., browser, dashboard, webpage, application).

4. Identifying Relevant Occupancy Directory Entries

When utilizing and/or updating information/data stored in the occupancy database, various computing entities (e.g., distributed computing entities 110 and/or user computing entities 120) generate and transmit queries to the occupancy computing entity 100 to retrieve relevant information/data from the connected occupancy database. The generated queries may reflect any of a variety of information/data types available to the distributed computing entities 110 to accommodate any number of possible combinations of information/data identifying a particular occupant. For example, the information/data utilized to generate a query to the occupancy computing entity 100 may comprise an occupant name and at least part of a delivery address for the occupant. The partial delivery address may comprise, for example, a street name, street number, city name, state name, and zip code, but may omit a unit number for the occupant. Alternatively, the distributed computing entity 110 may generate a query of the occupancy database comprising a particular entity's unique identifier (e.g., user name, social security number, password, and/or the like). Thus, the distributed computing entities 110 may be configured to generate queries for the occupancy database based on any of a variety of information/data types provided to the distributed computing entity 110. For example, the distributed computing entity 110 may thus be configured to utilize shipping information/data provided for a particular item/shipment 102 to be delivered to the entity, or may utilize information/data provided by an entity when purchasing and/or leasing a property to generate a query of the occupancy database.

The occupancy computing entity 100 may then retrieve an entity profile stored within the occupancy database that matches the information/data provided in the query from the distributed computing entity 110, and may provide at least a portion of the occupancy directory information/data to the distributed computing entity. The occupancy computing entity 100 may be configured to utilize fuzzy matching logic when retrieving the relevant entity profile, to thereby accommodate potential typographical errors in the information/data provided in the query. For example, if a distributed computing entity 110 seeks information/data regarding John Doe, who lives at 123 Main Street, Atlanta, Ga. 30309 (as reflected in the example entity profile shown in FIG. 5), the occupancy computing entity 100 may be configured to identify this same profile even if the provided query requests information/data about Jon Doe, at 123 Maine Street, Atlanta, Ga. 30309.

As mentioned above, user computing entities 120 and/or distributed computing entities 110 may be configured to download at least a portion of the occupancy information/data stored in the occupancy database. In certain embodiments, the user computing entities 120 and/or distributed computing entities 110 may be configured to download select entity profiles, for example, corresponding to queries provided by those computing entities. As just one non-limiting example, a user computing entity 120 carried by an item/shipment delivery personnel may be configured to download and locally store entity profiles corresponding to item/shipment recipients for which the item/shipment delivery personnel is scheduled to deliver items/shipments during a particular delivery route.

Various user computing entities 120 and/or distributed computing entities 110 may be configured to utilize information/data stored in various entity profiles (e.g., downloaded and locally stored entity profiles) to supplement address information/data for various entities. Referring to the above non-limiting example, the user computing entity 120 corresponding to the delivery personnel may utilize information/data stored in the downloaded entity profiles to supplement delivery address information/data for various items/shipments 102 to be delivered during a particular delivery route. The user computing entity 120 may supplement the delivery address information/data for various item/shipment deliveries by including additional information/data regarding those item/shipment deliveries, such as missing unit numbers for particular item/shipment recipients, precise delivery location information/data (e.g., delivery to front door of unit/address/service point or delivery to building concierge).

In embodiments in which a carrier address database is in communication with the occupancy database, the carrier address database may be configured to retrieve information/data stored in particular entity profiles corresponding to items/shipments 102 to be delivered by carrier delivery personnel. A computing entity associated with the carrier address database may be configured to retrieve complete and/or supplemental address information/data corresponding to scheduled item/shipment deliveries, and may generate updated delivery labels to be generated and applied to the various items/shipments 102 to facilitate delivery of those items/shipments 102 by delivery personnel. For example, the computing entity associated with the carrier address database may be configured to generate updated delivery labels upon a determination that existing delivery labels comprise incomplete delivery information/data for the corresponding shipments/items 102 (e.g., missing unit numbers, and/or the like).

5. Enabling Communication between User Computing Entity and Occupant

The entity profiles for various entities may comprise contact information/data for those entities, and therefore various embodiments may enable communication between user computing entities 120 and an entity associated with a particular entity profile. In certain embodiments, a user computing entity 120 may be configured to query the occupancy database (or portions of the occupancy database downloaded to and stored locally on the user computing entity 120) for contact information/data for a particular entity. The user computing entity 120 may thereafter utilize contact information/data stored in an entity profile for the entity to establish a communication with the entity (e.g., via the entity's user computing entity 120). In various embodiments, the user computing entity 120 may be configured to automatically generate and transmit notifications, communications, and/or the like to the entity upon establishing a communication channel with the entity.

In the item/shipment delivery context, a user computing entity 120 associated with delivery personnel may be configured to automatically retrieve contact information/data for item/shipment recipients located along the delivery personnel's upcoming delivery route. In certain embodiments, the user computing entity 120 may be configured to automatically retrieve contact information/data for item/shipment recipients upon the occurrence of one or more pre-defined trigger events, such as a determination that the user computing entity 120 is located within a predefined distance of the item/shipment delivery location corresponding to the entity, upon a determination that the item/shipment delivery is expected to occur within a predefined time, upon a determination that the item/shipment delivery is expected to occur within a predefined number of delivery stops, upon a determination that the entity is unavailable to accept delivery of the item/shipment 102, and/or the like. Moreover, the communication may be automatically generated (e.g., an automated audio message sent to the entity, an automated text-based message sent to the entity, and/or the like) or manually generated (e.g., the delivery personnel manually speaking to the entity, the delivery personnel manually generating a message to be transmitted to the entity, and/or the like).

Moreover, the user computing entity 120 associated with the delivery personnel may be configured to receive and/or process responses received from the entity. In various embodiments, the entity may be provided with the option for responding with delivery authorization instructions, "leave-at" instructions indicating a desired location for delivery, and/or the like. The user computing entity 120 may be configured to provide the entity's response to the delivery personnel at an appropriate time (e.g., upon the occurrence of a trigger event, such as being located at a delivery location corresponding to the entity).

As yet another example, the user computing entity 120 associated with the delivery personnel may be configured to provide a communication to the entity upon the occurrence of an unsuccessful delivery attempt (e.g., the entity was unavailable to accept delivery and therefore the delivery personnel did not leave the item/shipment 102 at the intended delivery location). The unsuccessful delivery attempt information/data may comprise information/data identifying an alternative delivery location where the item/shipment 102 was delivered, information/data identifying a proposed follow-up delivery attempt (e.g., a proposed time/date for making a second delivery attempt), and/or the like. Again, the user computing entity 120 may be configured to accept and/or utilize a response from the entity, such as indicating instructions for leaving the item/shipment 102 at an alternative delivery location (e.g., a property management office, a delivery locker, an alternative delivery location, and/or the like).

6. Enabling Wireless Communication between User Computing Entity and Service Point Devices As noted above in reference to FIG. 4, the entity profile may additionally comprise information/data enabling wireless communication between a user computing entity 120 (e.g., a user computing entity carried by a delivery personnel) and one or more service point devices 117 located at a unit/address/service point associated with an entity (e.g., one or more IOT-enabled devices located at an individual's residence). The information/data enabling wireless communication between a user computing entity 120 and one or more service point devices 117 may be embodied as security credentials utilized to verify the identity of a trusted user computing entity 120 prior to establishing a wireless communication connection. The security credentials may be stored in the entity profile to enable a user computing entity 120 to present those security credentials to a service point device 117 without any user interaction. As discussed herein, the entity profile may comprise an executable computer program/file configured to automatically cause the executing computing entity (e.g., a user computing entity 120) to establish a wireless communication interface with one or more service point devices 117 upon the occurrence of one or more trigger events (e.g., moving the executing computing entity within a wireless communication range of the one or more service point devices 117). The executable computer program/file may comprise executable portions for initiating an appropriate wireless communication interface on an executing computing entity (e.g., selecting an appropriate wireless communication interface from Bluetooth, Wi-Fi, NFC, and/or the like via a user computing entity 120 executing the stored program), for placing the executing computing entity into a "discoverable" mode that may be detected by one or more service point devices 117, for initiating a virtual handshake with one or more service point devices 117, for providing one or more passcodes, security tokens, identity verification tokens, and/or the like to the service point devices 117, and/or the like.

As yet another example, the entity profile may comprise information/data indicative of instructions for establishing a wireless communication connection with the one or more service point devices 117 via software and/or firmware stored locally on an executing computing entity (e.g., user computing entity 120). The instructions may comprise information/data that may be useable by an executing computing entity (e.g., user computing entity 120) to establish a wireless communication connection with a service point device 117, for example, by identifying a wireless communication interface type utilized to communicate with the service point device 117, identifying a wireless communication range of the service point device 117 (to identify when the executing computing entity can initiate communication with the service point device 117), identifying a password or other security credentials necessary to establish a wireless communication connection with the service point device 117, and/or the like.

In certain embodiments, the security credentials may be stored within the entity profile as multi-use security credentials or one-time-use security credentials. The security credentials may be updated and/or provided by the entity associated with the entity profile, or the security credentials may be automatically generated by the service point device 117, the occupancy computing entity 100, and/or the like. In embodiments in which the entity generates and/or updates the security credentials, the entity may be enabled to provide the updated security credentials directly to the occupancy computing entity 100 for storage in the occupancy database via a user interface provided via a distributed computing entity 110 and/or a user computing entity 120. However, it should be understood that the security credentials may be provided to a connected computing system, such as a carrier address management computing entity, which then provides the security credentials to the occupancy database. Moreover, the security credentials (and/or other information/data necessary for establishing a wireless communication connection with the service point device 117) may be encrypted, hashed, and/or the like to prevent unauthorized users from gaining access to the information/data.

As just one example, a user computing entity 120 associated with an item/shipment delivery personnel may establish a wireless communication connection with a service point device 117 located at an entity's unit/address/service point. The user computing entity 120 may gain access to the entity profile corresponding to the entity (e.g., by downloading and locally storing the entity profile prior to approaching the entity's unit/address/service point to complete an item/shipment delivery). The entity profile comprises information/data that may be utilized by the user computing entity 120 to establish a wireless communication connection with the service point device 117 located at the entity's unit/address/service point (including security credentials), and accordingly the user computing entity 120 may be configured to initiate a process for establishing the wireless communication connection once the user computing entity 120 is within a wireless communication range of the service point device 117. As a part of the process for establishing a wireless communication connection with the service point device 117, the user computing entity 120 may pass the security credentials to the service point device 117, which may be configured to check the provided security credentials against expected security credentials (e.g., as stored in the occupancy database). Upon determining that the provided security credentials match the expected security credentials, the service point device 117 may establish a wireless communication connection with the user computing entity 120.

In certain embodiments, once a wireless communication interface is established between a user computing entity 120 and a service point device 117, the service point device 117 may be leveraged to determine whether an individual is available to receive an item/shipment 102 at the service point. The service point device 117 may thus provide information/data to the user computing entity 120 about the status of the unit/address/service point associated with the entity. For example, the service point device 117 may be configured to convey information/data to the user computing entity 120, such as whether an individual is located at the unit/address/service point. In such an example, item/shipment delivery personnel may utilize the information/data to determine whether to attempt to deliver an item/shipment 102 to the entity. For example, item/shipment information/data corresponding to the item/shipment may indicate that delivery of the item/shipment requires a signature from the individual receiving the item/shipment (e.g., the consignee to whom the item/shipment is to be delivered and/or an agent thereof). In such an example, the delivery personnel may skip a delivery attempt to the delivery location upon a determination that no one is present to accept delivery. In such instances, the user computing entity 120 may receive information/data from the service point device 117 indicating that no one is available to accept delivery, and the user computing entity 120 may generate a notification for the delivery personnel to skip delivery to the entity, because a delivery attempt would likely be unsuccessful.

Moreover, in certain embodiments, the user computing entity 120 may be configured to generate an electronic delivery confirmation of an item/shipment 102 based on a wireless communication connection between the user computing entity 120 and the service point device 117. The user computing entity 120 may be configured to employ electronic delivery confirmation criteria prior to utilizing the electronic delivery confirmation. For example, the user computing entity 120 may be configured to employ the electronic delivery confirmation upon determining that an individual is available to accept delivery at the intended destination for an item/shipment 102. Upon determining that the electronic delivery confirmation criteria has been satisfied, the user computing entity 120 may be configured to generate a delivery confirmation indication (e.g., to be transmitted to an item/shipment recipient's user computing entity 120, to be stored in a carrier-specific computing entity, and/or the like) upon establishing a wireless communication connection with the service point device 117. Because the wireless communication protocol associated with service point device 117 has a limited geographical range, the establishment of a wireless communication connection between the item/shipment delivery personnel's user computing entity 120 and the service point device 117 indicates that the item/shipment delivery personnel visited the serviceable point corresponding to the item/shipment delivery destination. In such embodiments, the generated electronic delivery confirmation indication may be utilized in lieu of a recipient signature to evidence delivery of the item/shipment 102 to the destination location.

Moreover, the wireless communication interface established between the user computing entity 120 and the service point device 117 may enable the user computing entity 120 to control various mechanisms of the service point device 117. For example, in embodiments in which the service point device 117 is a garage door opener (e.g., an IOT enabled garage door opener) or a door lock (e.g., an IOT enabled door lock), the user computing entity 120 may be configured to control the garage door and/or door lock to gain access to the interior of the unit/address/service point (e.g., by opening the garage door or unlocking the door lock). Thus, delivery personnel may be enabled to place an item/shipment 102 within a secure area of a destination location after the delivery personnel is granted access to the interior of the destination location. In certain embodiments, the user computing entity 120 and/or the service point device 117 may be configured to automatically close and/or lock access to the interior of the location after delivery has been completed.

7. Identifying Delivery Redirection Options Based on Entity Profile

Upon determining that delivery cannot be completed to an intended destination location for an item/shipment 102, item/shipment delivery personnel may complete delivery of an item/shipment to an alternative destination location where the intended item/shipment recipient may pick-up the item/shipment 102 after delivery. In certain embodiments, the entity profile for various entities may identify desired alternative destination locations for effecting delivery of shipments/items 102 after an unsuccessful delivery attempt.

The alternative destination locations may be identified for particular entity profiles by entities associated with those entity profiles (e.g., via user input generated at a distributed computing entity 110 or user computing entity 120) or the alternative destination locations may be identified automatically, for example by the occupancy computing entity 100 or distributed computing entity 110 associated with a particular location (e.g., an apartment complex management computing entity). For example, a distributed computing entity 110 may automatically identify a property management office as an alternative delivery location for entity profiles corresponding to units/addresses/service points within the property. As yet another example, the occupancy computing entity 100 may be configured to automatically identify nearby item/shipment storage lockers (e.g., identified as being within a threshold distance) as an alternative delivery location associated with particular entity profiles. As yet another example, an entity (e.g., an apartment resident) may identify one or more neighboring properties as alternative destination locations for associated entity profiles.

In embodiments in which the occupancy database is in electronic communication with a carrier address management database (e.g., managing a carrier loyalty program and storing item/shipment recipient preference information), the carrier address management database may be configured to extract information/data from the occupancy database indicative of potential alternative delivery destinations for various locations and/or entities. The carrier address management database may be configured to import those alternative delivery destinations into corresponding profiles for various entities to provide those entities with options for selecting a preferred alternative delivery destination location. The carrier address management database may be configured to transmit information/data to the occupancy database indicative of an entity's preference for an alternative delivery destination, and the occupancy database may store an indicator of the entity's preferred alternative delivery address within an entity profile corresponding to the entity.

In certain embodiments, the occupancy database may store a plurality of alternative delivery destinations for each of a plurality of entity profiles, each of the plurality of alternative delivery destinations being applicable for shipments/items 102 satisfying one or more criteria. For example, a first alternative delivery destination may be preferred for climate-controlled shipments, and a second alternative delivery destination may be applicable for non-temperature sensitive shipments.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An automated method for confirming real-time item recipient availability via a delivery mobile computing entity in communication with a central occupancy database, the method comprising:
    receiving via one or more networks, at the central occupancy database and from a plurality of service point devices located at respective service points, each service point device affixed to a building or structure and associated with a particular customer of a plurality of customers, real-time customer status data for each customer of the plurality of customers, wherein for each customer the real-time customer status data indicates whether the customer is located at the associated service point;
    updating availability data stored in customer profiles in the central occupancy database corresponding to each customer of the plurality of customers to reflect a real-time customer status for each customer;
    receiving via a wireless communication network, at the central occupancy database and from the delivery mobile computing entity, a query for customer status data for a first customer;
    retrieving real-time customer status data for the first customer from a first customer profile corresponding to the first customer; and
    upon determining that the real-time customer status data for the first customer indicates that the first customer is available at a service point associated with the first customer, transmitting to the delivery mobile computing entity via the wireless communication network:
        a) connectivity data, stored in the central occupancy database, for a service point device associated with the first customer and located at the service point, the connectivity data enabling the delivery mobile computing entity to establish a wireless communication interface between the delivery mobile computing entity and the service point device, and
        b) an indicator to complete delivery of an item at the service point associated with the first customer.

2. The method of claim 1, further comprising, upon determining that the real-time customer status data for the first customer indicates that the first customer is unavailable, transmit an alternative indicator to the delivery mobile computing entity.

3. The method of claim 2, wherein the alternative indicator identifies an alternative delivery location to complete delivery of the item.

4. The method of claim 1, wherein the connectivity data comprises an executable program which, when executed by the delivery mobile computing entity, automatically establishes the wireless communication interface between the delivery mobile computing entity and the service point device.

5. The method of claim 4, wherein the connectivity data identifies wireless connectivity data for a customer mobile computing entity associated with the first customer, and wherein transmitting at least a portion of the connectivity data comprises transmitting the wireless connectivity data to enable wireless communication between the delivery mobile computing entity associated with a delivery person and the customer mobile computing entity associated with the first customer.

6. The method of claim 1, wherein the query for customer status data for the first customer comprises a first customer identifier, and retrieving the real-time customer status data for the first customer comprises:
    identifying a customer profile having the first customer identifier; and
    retrieving the real-time customer status data from the identified customer profile.

7. A computer system for confirming real-time item recipient availability via a delivery mobile computing entity in communication with a central occupancy database, the system comprising:

the delivery mobile computing entity, associated with a delivery person, comprising at least one non-transitory memory storage entity and at least one processor, wherein the delivery mobile computing entity is configured to generate an inquiry to the central occupancy database via a wireless communication network for customer status data for a first customer scheduled to receive an item delivery; and the central occupancy database comprising at least one non-transitory memory storage entity storing a plurality of customer profiles corresponding to a plurality of customers, and wherein the central occupancy database is configured to:

receive real-time customer status data from a plurality of service point devices each corresponding to a particular service point and a particular customer, each service point device affixed to a building or structure at the particular service point;

update the customer profiles to reflect the real-time customer status data for customers corresponding to each of the customer profiles;

receive the inquiry for the customer status data for the first customer via the wireless communication network;

retrieve real-time customer status data for the first customer from a first customer profile corresponding to the first customer, wherein the real-time customer status data for the first customer indicates whether the first customer is located at a corresponding service point, and wherein the first customer profile comprises connectivity data for a service point device at the corresponding service point and associated with the first customer; and when the real-time customer status data indicates that the first customer is located at the corresponding service point, transmit to the delivery mobile computing entity via the wireless communication network:

a) at least a portion of the connectivity data, the portion of the connectivity data comprising an executable program which, when executed by the delivery mobile computing entity, automatically establishes a wireless communication connection between the delivery mobile computing entity and the service point device, and b) an indicator confirming, in real time, availability of the first customer for delivery of the item at the corresponding service point.

8. The computer system of claim 7, wherein the delivery mobile computing entity is further configured to:

receive the real-time customer status data; and generate delivery confirmation data after receipt of the real-time customer status data.

9. The computer system of claim 8, wherein each of the plurality of customer profiles comprises connectivity data for the corresponding customer, and wherein the delivery mobile computing entity is configured to, based at least in part on the portion of the connectivity data, establish the wireless communication connection between the delivery mobile computing entity and the service point device associated with the first customer.

10. The computer system of claim 9, wherein the delivery mobile computing entity is configured to generate the delivery confirmation data upon establishing the wireless communication connection with the service point device associated with the first customer.

11. The computer system of claim 7, wherein the central occupancy database is further configured to, upon determining that the customer status data for the first customer indicates that the first customer is unavailable, transmit an alternative indicator to the delivery mobile computing entity.

12. The computer system of claim 11, wherein the alternative indicator identifies an alternative delivery location for completing delivery of the item for the first customer.

13. A computer system for automatically confirming real-time item recipient availability via a delivery mobile computing entity in communication with a central occupancy database, the system comprising one or more non-transitory memory storage areas and one or more processors, the one or more processors collectively configured to:

receive via a network, from a plurality of service point devices located at respective service points, each service point device affixed to a building or structure and associated with a particular customer of a plurality of customers, real-time customer status data for each customer of the plurality of customers, wherein for each customer the real-time customer status data indicates whether the customer is located at the associated service point;

update availability data stored in customer profiles corresponding to each customer of the plurality of customers to reflect the real-time customer status data for each customer;

receive via a wireless communication network, from the delivery mobile computing entity associated with a delivery person, a query for customer status data for a first customer;

retrieve, from the one or more non-transitory memory storage areas, real-time status data for the first customer from a first customer profile corresponding to the first customer; and upon determining that the real-time customer status data for the first customer indicates that the first customer is available at a service point associated with the first customer, transmit to the delivery mobile computing entity via the wireless communication network:

a) connectivity data, retrieved from the central occupancy database, for a service point device associated with the first customer and located at the service point, the connectivity data enabling the delivery mobile computing entity to establish a wireless communication interface between the delivery mobile computing entity and the service point device, and b) an indicator to complete delivery of an item at the service point associated with the first customer.

14. The computer system of claim 13, wherein the one or more processors are further configured to, upon determining that the real-time customer status data for the first customer indicates that the first customer is unavailable, transmit an alternative indicator to the delivery mobile computing entity.

15. The computer system of claim 14, wherein the alternative indicator identifies an alternative delivery location to complete delivery of the item.

16. The computer system of claim 13, wherein the first customer profile comprises the connectivity data.

17. The computer system of claim 16, wherein the connectivity data identifies wireless connectivity data for a customer mobile computing entity associated with the first customer, and wherein transmitting at least a portion of the connectivity data comprises transmitting the wireless connectivity data to enable wireless communication between the delivery mobile computing entity associated with the delivery person and the customer mobile computing entity associated with the first customer.

18. The computer system of claim 13, wherein the query for first customer status data comprises a first customer identifier, and retrieving the real-time customer status data for the first customer comprises:
  identifying a customer profile having the first customer identifier; and
  retrieving the real-time customer status data from the identified customer profile.

\* \* \* \* \*

UNITED STATES PATENT AND TRADEMARK OFFICE
CERTIFICATE OF CORRECTION

PATENT NO. : 11,276,025 B2
APPLICATION NO. : 15/791819
DATED : March 15, 2022
INVENTOR(S) : Juan Perez It is certified that error appears in the above-identified patent and that said Letters Patent is hereby corrected as shown below:

On the Title Page

Item (71), in Column 1, in "Applicant", Line 2, delete "Altanta," and insert -- Atlanta, --.

On the page 3, item (56), in Column 1, under "Other Publications", Line 20, delete "ofU-" and insert -- of U- --.

In the Specification

In Column 9, Line 44, delete "truck-load," and insert -- truckload, --.

In Column 21, Lines 65-66, delete "pick up" and insert -- pick-up --.

Signed and Sealed this
Seventh Day of June, 2022

Katherine Kelly Vidal

Katherine Kelly Vidal
*Director of the United States Patent and Trademark Office*